US012482964B2

(12) United States Patent
Kimura

(10) Patent No.: US 12,482,964 B2
(45) Date of Patent: Nov. 25, 2025

(54) CONNECTOR ASSEMBLY AND CONNECTING METHOD

(71) Applicant: Japan Aviation Electronics Industry, Limited, Tokyo (JP)

(72) Inventor: Akira Kimura, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 239 days.

(21) Appl. No.: 18/480,715

(22) Filed: Oct. 4, 2023

(65) Prior Publication Data

US 2024/0178591 A1 May 30, 2024

(30) Foreign Application Priority Data

Nov. 30, 2022 (JP) ................................ 2022-191896

(51) Int. Cl.
*H05K 1/18* (2006.01)
*H01R 4/70* (2006.01)
*H01R 12/63* (2011.01)
*H01R 43/00* (2006.01)

(52) U.S. Cl.
CPC ............... *H01R 12/63* (2013.01); *H01R 4/70* (2013.01); *H01R 43/00* (2013.01)

(58) Field of Classification Search
CPC ........... H05K 1/189; H01R 13/40; H01R 4/70
See application file for complete search history.

(56) References Cited

U.S. PATENT DOCUMENTS

| | | | | |
|---|---|---|---|---|
| 5,030,794 A * | 7/1991 | Schell | H01B 7/0861 | 174/117 FF |
| 2016/0190712 A1* | 6/2016 | Hirooka | H01R 13/65914 | 174/84 C |
| 2018/0118137 A1* | 5/2018 | Tsukamoto | B60R 16/0215 | |
| 2021/0075146 A1* | 3/2021 | Matsuo | H01R 13/5025 | |
| 2023/0122992 A1* | 4/2023 | Kou | H01B 7/0846 | 174/72 A |

FOREIGN PATENT DOCUMENTS

| | | |
|---|---|---|
| EP | 4379963 A1 | 6/2024 |
| JP | 2874405 B2 | 3/1999 |
| JP | 2004063280 A | 2/2004 |
| JP | 2007-214087 A | 8/2007 |

* cited by examiner

*Primary Examiner* — Sherman Ng
(74) *Attorney, Agent, or Firm* — MUNCY, GEISSLER, OLDS & LOWE, P.C.

(57) ABSTRACT

A connector assembly includes a sheet type conductive member having a flexible conductor, an electric wire and a connector, the connector having a first insulator with a first retaining surface and a second insulator with a second retaining surface, the sheet type conductive member having a first sheet portion with a retained portion, a second sheet portion joined to the retained portion via a folding-back line and disposed to face the second retaining surface with the second sheet portion being folded back onto the retained portion along the folding-back line, and at least one electric wire inserting hole penetrating the sheet type conductive member, the conductor portion of the electric wire being passed through the electric wire inserting hole and disposed between the retained portion and the second sheet portion.

18 Claims, 15 Drawing Sheets

CONNECTOR ASSEMBLY AND CONNECTING METHOD

BACKGROUND OF THE INVENTION

The present invention relates to a connector assembly and a connecting method, particularly to a connector assembly and a connecting method that electrically connect a conductor portion of an electric wire to a flexible conductor exposed on a surface of a sheet type conductive member.

In recent years, attention has been drawn to so-called smart clothes that can obtain user's biological data such as the heart rate and the body temperature only by being worn by the user. Such smart clothes have an electrode disposed at a measurement site and constituted of a flexible conductor, and when a wearable device serving as a measurement device is electrically connected to the electrode, biological data can be transmitted to the wearable device.

The electrode and the wearable device can be interconnected by, for instance, use of a connector connected to the flexible conductor.

However, when the wearable device is situated away from the measurement site, it is necessary to provide an electric path connecting the electrode disposed at the measurement site to the place where the connector is attached, and if such an electric path is formed from a flexible conductor, this causes higher electric resistance and higher cost.

To interconnect an electrode constituted of a flexible conductor and a wearable device by use of an electric wire that has low electric resistance and is inexpensive, it has been desired to develop a small-sized connector connecting the electric wire to the flexible conductor disposed on a garment.

As a connector for connecting an electric wire to a flexible conductor, for instance, JP 2007-214087 A discloses a connector as shown in FIG. 35. This connector includes a first connector 2 connected to an end of a substrate 1 and a second connector 4 attached to tips of electric wires 3, and the electric wires 3 can be connected to a flexible conductor of the substrate 1 by fitting the second connector 4 to the first connector 2.

However, the first connector 2 and the second connector 4 that are separately attached to the end of the substrate 1 and the tips of the electric wires 3 need to be fitted to each other in order to connect the electric wires 3 to the flexible conductor of the substrate 1, and this causes a larger size of a device; and there is a separable connection portion between the first connector 2 and the second connector 4, which impairs the reliability of electric connection.

SUMMARY OF THE INVENTION

The present invention has been made to solve the conventional problem as above and aims at providing a connector assembly that can electrically connect a conductor portion of an electric wire to a flexible conductor exposed on a surface of a sheet type conductive member with high reliability while its size can be reduced.

The present invention also aims at providing a connecting method for electrically connecting a conductor portion of an electric wire to a flexible conductor exposed on a surface of a sheet type conductive member.

A connector assembly according to the present invention comprises:

- a sheet type conductive member having a flexible conductor exposed on a surface of the sheet type conductive member;

- an electric wire having a conductor portion; and
- a connector connecting the conductor portion to the flexible conductor,
- wherein the connector includes a first insulator having a first retaining surface and a second insulator having a second retaining surface facing the first retaining surface,
- wherein the sheet type conductive member includes a first sheet portion having a retained portion disposed to face the first retaining surface, a second sheet portion joined to the retained portion via a folding-back line and disposed to face the second retaining surface with the second sheet portion being folded back onto the retained portion along the folding-back line, and at least one electric wire inserting hole formed in at least one of the retained portion and the second sheet portion and penetrating the sheet type conductive member,
- wherein the flexible conductor is exposed at least on a surface of the retained portion,
- wherein the conductor portion of the electric wire is passed through the electric wire inserting hole and disposed between the retained portion and the second sheet portion, and
- wherein the first insulator and the second insulator are fixed with each other such that the retained portion and the second sheet portion are superposed on each other and disposed between the first retaining surface and the second retaining surface, whereby the flexible conductor makes contact with and is electrically connected to the conductor portion of the electric wire.

A connecting method according to the present invention is one for connecting a conductor portion of an electric wire to a flexible conductor exposed on a surface of a sheet type conductive member, the method comprising:

- passing the conductor portion of the electric wire through at least one electric wire inserting hole formed in at least one of a retained portion and a second sheet portion in the sheet type conductive member having a first sheet portion and the second sheet portion joined to the retained portion of the first sheet portion via a folding-back line, the at least one electric wire inserting hole penetrating the sheet type conductive member,
- folding back the second sheet portion onto the retained portion along the folding-back line so that the conductor portion of the electric wire is disposed between the retained portion and the second sheet portion, and
- fixing the first insulator and the second insulator with each other with the retained portion and the second sheet portion being sandwiched between a first retaining surface of the first insulator and a second retaining surface of the second insulator, whereby the flexible conductor makes contact with and is electrically connected to the conductor portion of the electric wire.

DETAILED DESCRIPTION OF THE INVENTION

Embodiments of the present invention are described below based on the accompanying drawings.

Embodiment 1

Figure 1:
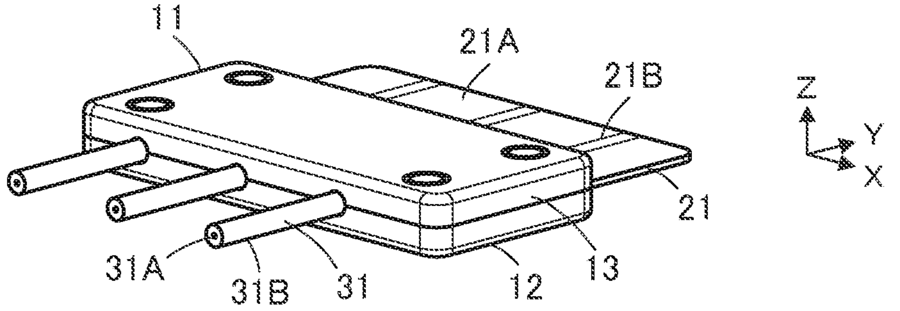
FIG. 1 is a perspective view showing a connector assembly according to Embodiment 1.

FIG. 1 shows a connector assembly according to Embodiment 1. The connector assembly is obtained by connecting conductor portions 31A of a plurality of coated electric wires 31 to a sheet type conductive member 21 by means of a connector 11.

The connector 11 includes a first insulator 12 and a second insulator 13 each made of an insulating resin material.

The sheet type conductive member 21 is obtained by forming a plurality of flexible conductors 21B on a surface of a sheet type insulating base 21A. The flexible conductors 21B are aligned in a predetermined alignment direction, separately form linearly extending patterns, and are exposed on a surface of the sheet type conductive member 21.

The coated electric wires 31 are aligned in the predetermined alignment direction as with the flexible conductors 21B of the sheet type conductive member 21, and each extend in parallel to the surface of the sheet type conductive member 21 and in a direction perpendicular to the alignment direction. Each coated electric wire 31 has a structure in which an outer periphery of the conductor portion 31A is covered with an insulating coating portion 31B. With the connector 11, the conductor portions 31A of the covered electric wires 31 are electrically connected to the flexible conductors 21B exposed on the surface of the sheet type conductive member 21. The conductor portion 31A of the coated electric wire 31 may be either a so-called solid wire constituted of one conductor or a so-called stranded wire constituted of plural conductors being stranded.

For convenience, the sheet type conductive member 21 is defined as extending along an XY plane, the predetermined alignment direction of the flexible conductors 21B and the coated electric wires 31 is referred to as "X direction," the direction in which each coated electric wire 31 extends toward the connector 11 is referred to as "+Y direction," and the direction orthogonal to an XY plane is referred to as "Z direction."

Figure 2:
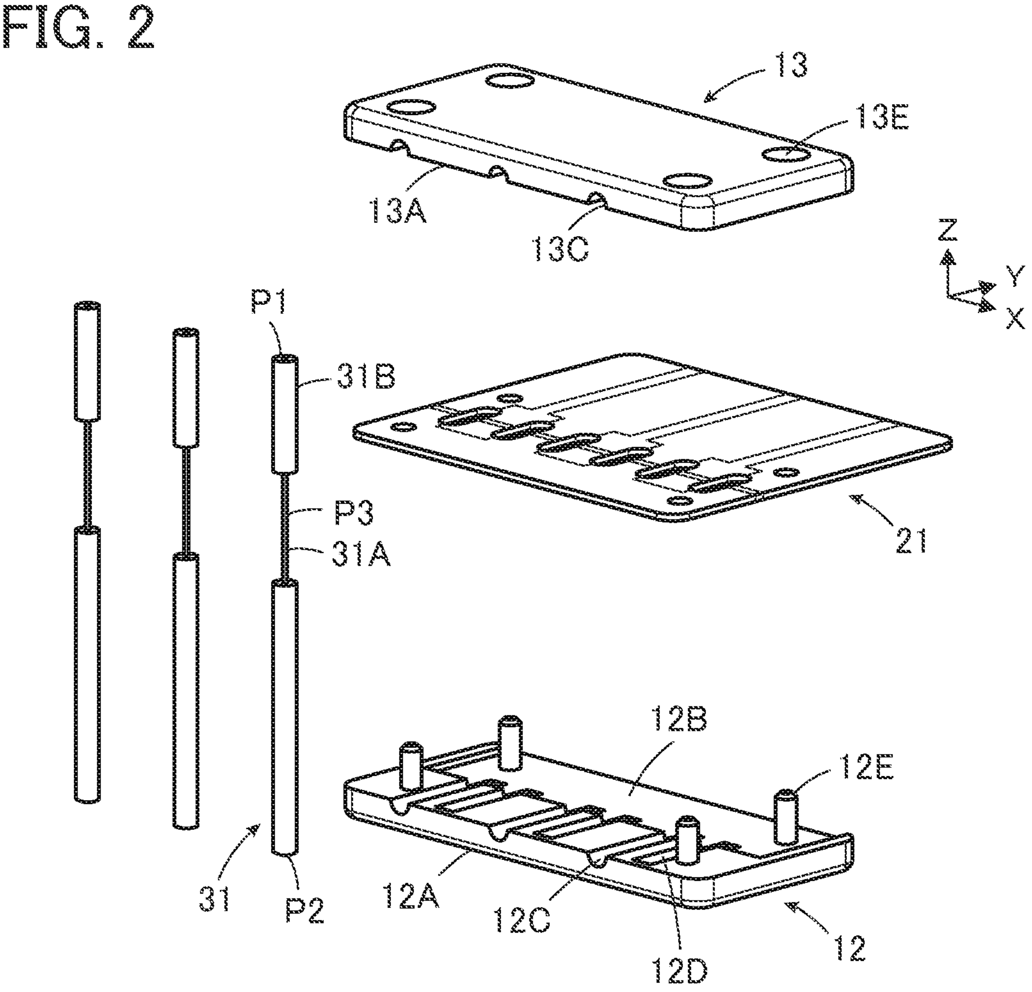
FIG. 2 is an assembly view of the connector assembly according to Embodiment 1.

FIG. 2 shows an assembly view of the connector assembly according to Embodiment 1. The sheet type conductive member 21 is disposed on the +Z direction side of the first insulator 12, and the second insulator 13 is disposed on the +Z direction side of the sheet type conductive member 21.

In addition, the coated electric wires 31 are each disposed in such a position as to extend in the Z direction on the −Y direction side of the sheet type conductive member 21.

The first insulator 12 includes a flat plate portion 12A of rectangular shape extending along an XY plane, and a first retaining surface 12B of planar shape recessed in the −Z direction and facing in the +Z direction is formed at a +Y direction-side portion of the flat plate portion 12A. In addition, electric wire accommodating grooves 12C and 12D are formed on a −Y direction-side portion of the flat plate portion 12A, the electric wire accommodating grooves 12C extending in the Y direction from the first retaining surface 12B to a −Y directional end of the flat plate portion 12A, the electric wire accommodating grooves 12D being each disposed adjacent to the corresponding electric wire accommodating groove 12C on the +X direction side of the electric wire accommodating groove 12C, extending in the Y direction from the first retaining surface 12B, and terminating in front of the −Y directional end of the flat plate portion 12A.

These electric wire accommodating grooves 12C and 12D are opened toward the +Z direction and each have a groove width and a groove depth that allow the insulating coating portion 31B of the coated electric wire 31 to be accommodated in the grooves 12C and 12D. The adjacent electric wire accommodating grooves 12C and 12D form a pair, and a plurality of the pairs of electric wire accommodating grooves 12C and 12D corresponding to the coated electric wires 31 are formed in the flat plate portion 12A.

Further, the flat plate portion 12A is provided with a plurality of bosses 12E projecting in the +Z direction.

The second insulator 13 has a flat plate portion 13A of rectangular shape extending along an XY plane, and as with the first insulator 12, a second retaining surface of planar shape (not shown) recessed in the +Z direction and facing in the −Z direction is formed at a +Y direction-side portion of the flat plate portion 13A. In addition, electric wire accommodating grooves 13C and electric wire accommodating grooves not shown are formed at a −Y direction-side portion and in a surface, facing in the −Z direction, of the flat plate portion 31A, the electric wire accommodating grooves 13C extending in the Y direction from the second retaining surface to a −Y directional end of the flat plate portion 13A, the electric wire accommodating grooves not shown being each disposed adjacent to the corresponding electric wire accommodating groove 13C on the +X direction side of the electric wire accommodating groove 13C, extending in the Y direction from the second retaining surface, and terminating in front of the −Y directional end of the flat plate portion 13A.

These electric wire accommodating grooves 13C and electric wire accommodating grooves not shown correspond to the electric wire accommodating grooves 12C and 12D of the first insulator 12, are opened toward the −Z direction, and each have a groove width and a groove depth that allow the insulating coating portion 31B of the coated electric wire 31 to be accommodated in the groove 13C and the groove not shown.

Further, the flat plate portion 13A is provided with a plurality of fixing holes 13E penetrating the flat plate portion 13A in the Z direction. The fixing holes 13E separately correspond to the bosses 12E of the first insulator 12.

The coated electric wires 31 in assembling the connector assembly are each disposed in such a position as to extend in the Z direction such that a tip portion P1 faces in the +Z direction and that a base end portion P2 faces in the −Z direction. In addition, a conductor exposed portion P3, in which the conductor portion 31A is exposed over a predetermined Z directional length by removing the insulating coating portion 31B, is formed at a position away from the tip portion P1 of each coated electric wire 31 by a predetermined distance in the −Z direction.

Figure 3:
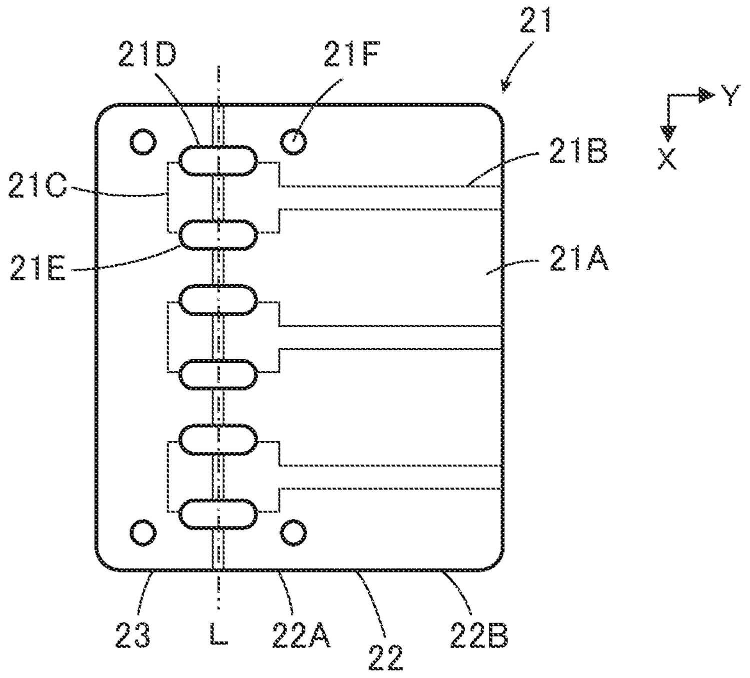
FIG. 3 is a plan view showing a sheet type conductive member used in Embodiment 1.

As shown in FIG. 3, the sheet type conductive member 21 includes a first sheet portion 22 and a second sheet portion 23 disposed on the −Y direction side of the first sheet portion 22. A retained portion 22A is disposed at a −Y direction-side portion of the first sheet portion 22, and an extension portion 22B extending toward the +Y direction is disposed on the +Y direction side of the retained portion 22A. The second sheet portion 23 is joined to the retained portion 22A of the first sheet portion 22 via a folding-back line L extending in the X direction. The second sheet portion 23, the retained portion 22A, and the extension portion 22B are integrally formed continuously in the Y direction.

The flexible conductors 21B exposed on the surface of the sheet type conductive member 21 on the +Z direction side are each disposed continuously from the second sheet portion 23 to the retained portion 22A and the extension portion 22B of the first sheet portion 22 beyond the folding-back line L. Each flexible conductor 21B has an electric wire connecting region 21C of substantially rectangular shape at a position overlapping the folding-back line L, and a pair of electric wire inserting holes 21D and 21E penetrating the sheet type conductive member 21 are separately formed on opposite sides in the X direction of the electric wire connecting region 21C on the folding-back line L. The pair of electric wire inserting holes 21D and 21E are each formed from a long hole that is sized so as to allow the insulating coating portion 31B of the coated electric wire 31 to pass through it. In addition, the pair of electric wire inserting holes 21D and 21E are separately situated to be in contact with the electric wire connecting region 21C on the opposite sides in the X direction of the electric wire connecting region 21C, and the flexible conductor 21B forming the electric wire connecting region 21C is disposed between the pair of electric wire inserting holes 21D and 21E.

A plurality of the pairs of electric wire inserting holes 21D and 21E as above are formed in the sheet type conductive member 21 to correspond to the coated electric wires 31.

Further, a plurality of through-holes 21F corresponding to the plurality of bosses 12E of the first insulator 12 are formed in the retained portion 22A and the second sheet portion 23 of the sheet type conductive member 21. One through-hole 21F formed in the retained portion 22A and another through hole 21F formed in the second sheet portion 23 are arranged symmetrically with respect to the folding-back line L.

Figure 4:
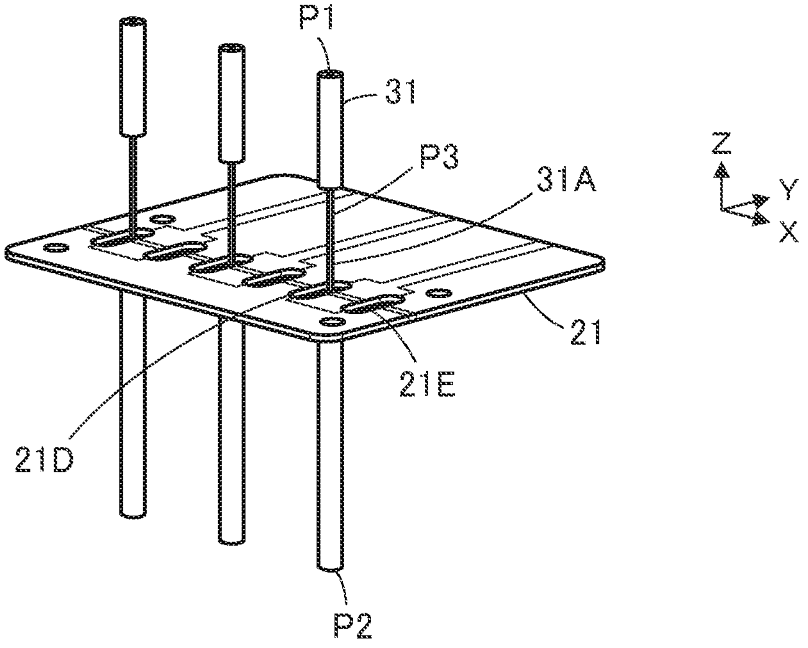
FIG. 4 is a perspective view showing a state where electric wires are separately passed through electric wire inserting holes of the sheet type conductive member in Embodiment 1.

When the connector assembly is assembled, first, as shown in FIG. 4, each of the coated electric wires 31 is passed through the electric wire inserting hole 21D that is one of the corresponding pair of electric wire inserting holes 21D and 21E of the sheet type conductive member 21. At this time, the coated electric wire 31 is disposed such that a part thereof from the conductor exposed portion P3 to the tip portion P1 is situated on the +Z direction side of the sheet type conductive member 21 and that a part thereof on the base end portion P2 side of the conductor exposed portion P3 is situated on the −Z direction side of the sheet type conductive member 21.

Figure 5:
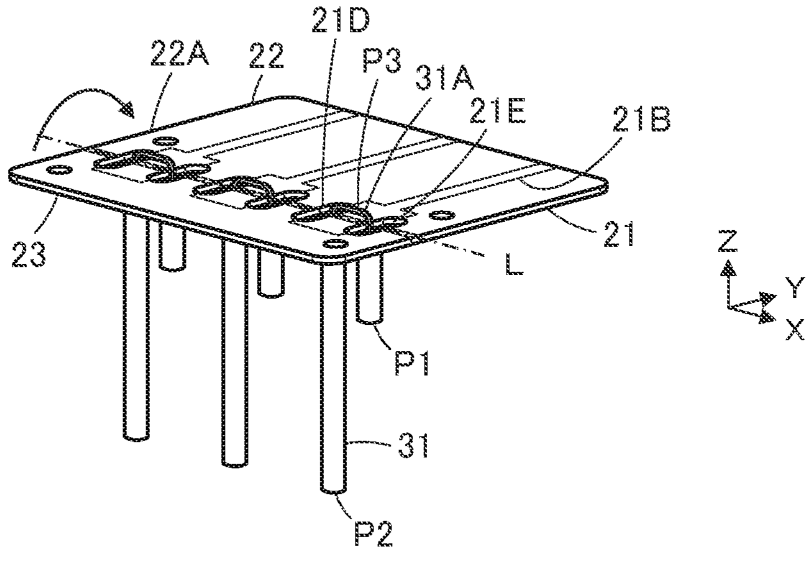
FIG. 5 is a perspective view showing a state where each of the electric wires is sequentially passed through a pair of electric wire inserting holes of the sheet type conductive member in Embodiment 1.

Next, the conductor exposed portion P3 is bent, and the tip portion P1 of each of the coated electric wires 31 is passed through the electric wire inserting hole 21E that is the other of the corresponding pair of the electric wire inserting holes 21D and 21E from the +Z direction. When each of the coated electric wires 31 is sequentially passed through the pair of electric wire inserting holes 21D and 21E in this manner, as shown in FIG. 5, the tip portion P1 of each of the coated electric wires 31 is situated on the −Z direction side of the sheet type conductive member 21, and the conductor portion 31A exposed at the conductor exposed portion P3 is situated between the pair of electric wire inserting holes 21D and 21E on the surface of the sheet type conductive member 21 on the +Z direction side.

Figure 6:
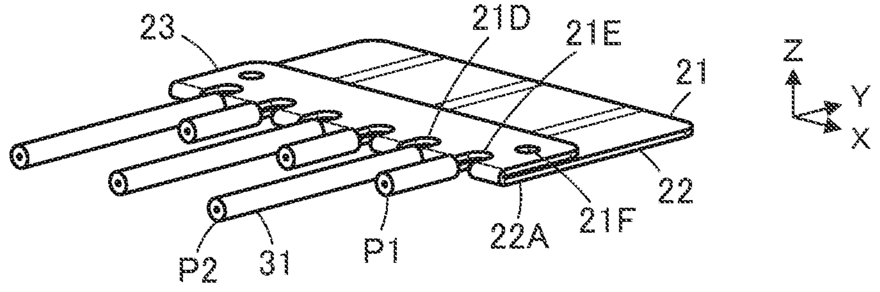
FIG. 6 is a perspective view showing a state where a second sheet portion of the sheet type conductive member in Embodiment 1 is folded back.

By folding back, in this state, the second sheet portion 23 of the sheet type conductive member 21 along the folding-back line L extending in the X direction that is the alignment direction of the coated electric wires 31 and the flexible conductors 21B, the second sheet portion 23 is rotated by 180 degrees around the folding-back line L so as to be superposed on the retained portion 22A of the first sheet portion 22 as shown in FIG. 6. At this time, with folding back of the second sheet portion 23, the coated electric wires 31 passed through the plurality of pairs of electric wire inserting holes 21D and 21E are rotated by 90 degrees around the folding-back line L, and the tip portion P1 and the base end portion P2 of each of the coated electric wires 31 extend from the sheet type conductive member 21 toward the −Y direction.

Since the through-holes 21F separately formed in the retained portion 22A and the second sheet portion 23 are arranged symmetrically with respect to the folding-back line L, when the second sheet portion 23 is folded back around the folding-back line L, the through-hole 21F formed in the second sheet portion 23 is superposed on the through-hole 21F formed in the retained portion 22A.

Figure 7:
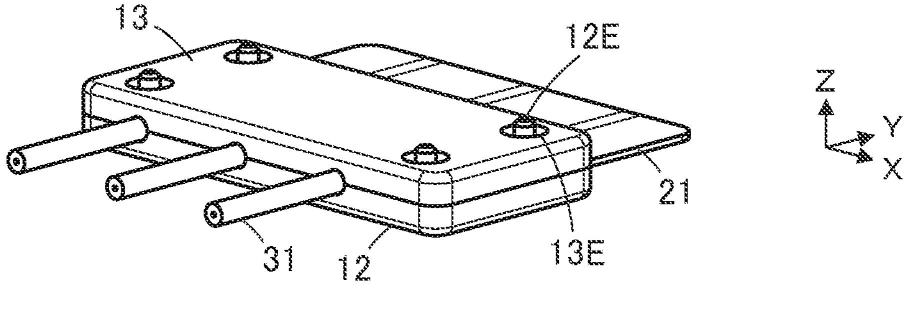
FIG. 7 is a perspective view showing a state where the sheet type conductive member in Embodiment 1 is sandwiched between a first insulator and a second insulator.

Then, with the bosses 12E of the first insulator 12 being passed through the through-holes 21F of the sheet type conductive member 21 from the −Z direction and further passed through the fixing holes 13E of the second insulator 13, the sheet type conductive member 21 is sandwiched between the first insulator 12 and the second insulator 13 as shown in FIG. 7. Consequently, the retained portion 22A of the first sheet portion 22 of the sheet type conductive member 21 faces the first retaining surface 12B of the first insulator 12, and the second sheet portion 23 superposed on the retained portion 22A faces the second retaining surface of the second insulator 13.

Tips of the bosses 12E projecting on the +Z direction side of the first insulator 13 are then thermally deformed, whereby the first insulator 12 and the second insulator 13 are fixed to each other to form the connector 11. Thus, the assembling operation of the connector assembly shown in FIG. 1 is completed.

Figure 8:
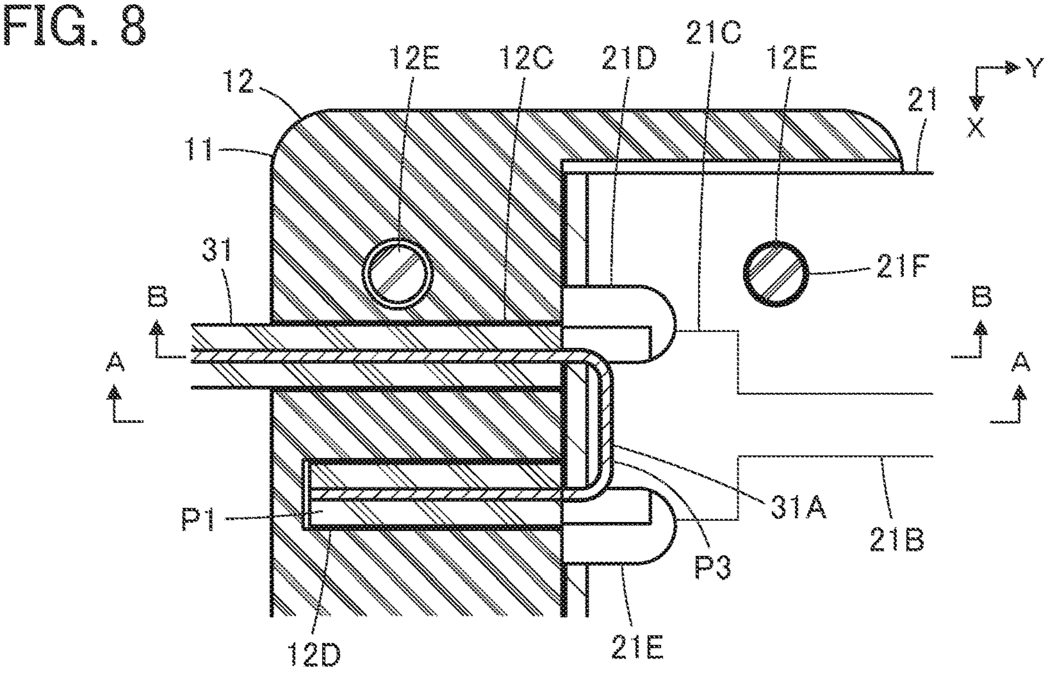
FIG. 8 is a partial cross-sectional plan view showing a state where a conductor portion of the electric wire and a flexible conductor make contact with each other in the connector assembly of Embodiment 1.
Figure 9:
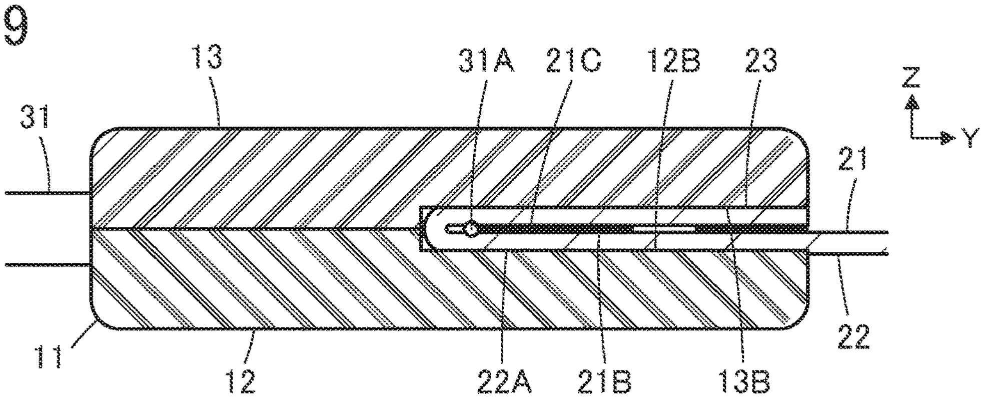
FIG. 9 is a cross-sectional side view of the connector assembly cut along line A-A of FIG. 8.

FIG. 8 shows the inside of the connector assembly. Since the electric wire connecting region 21C of the flexible conductor 21B is formed between the pair of the electric wire inserting holes 21D and 21E, with folding back of the second sheet portion 23, the flexible conductor 21B forming the electric wire connecting region 21C is folded in two parts, and the conductor portion 31A exposed at the conductor exposed portion P3 situated between the pair of electric wire inserting holes 21D and 21E is sandwiched between the two parts of the flexible conductor 21B thus folded as shown in FIG. 9. In this manner, the flexible conductor 21B makes contact with the conductor portion 31A of the coated electric wire 31 with predetermined contact pressure and is electrically connected to the conductor portion 31A.

Similarly, the plurality of flexible conductors 21B are electrically connected separately to the conductor portions 31A of the plurality of coated electric wires 31.

As shown in FIG. 9, the retained portion 22A of the first sheet portion 22 and the second sheet portion 23 of the sheet type conductive member 21 being superposed on each other are sandwiched between the first retaining surface 12B of the first insulator 12 and the second retaining surface 13B of the second insulator 13.

In addition, as shown FIG. 8, the tip portion P1 of the coated electric wire 31 projects in the −Y direction from the electric wire inserting hole 21E of the sheet type conductive member 21 and is accommodated in the electric wire accommodating groove 12D of the first insulator 12 and the electric wire accommodating groove not shown of the second insulator 13 in the connector 11.

Figure 10:
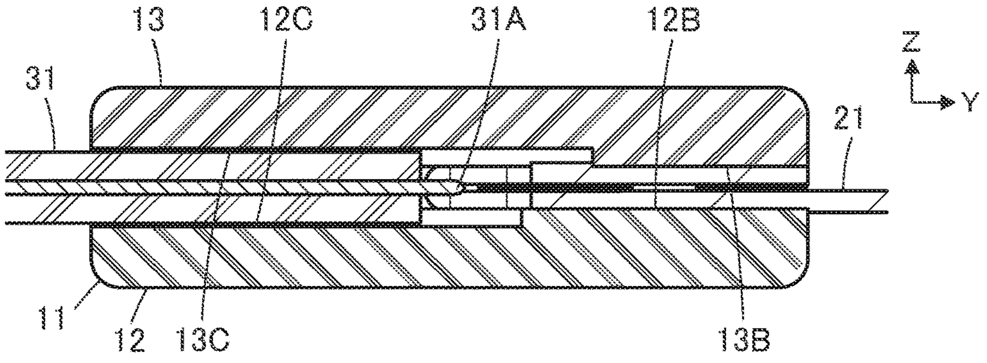
FIG. 10 is a cross-sectional side view of the connector assembly cut along line B-B of FIG. 8.

On the other hand, the part of the coated electric wire 31 on the base end portion P2 side projects in the −Y direction from the electric wire inserting hole 21D of the sheet type conductive member 21 and is accommodated in the electric wire accommodating groove 12C of the first insulator 12 and the electric wire accommodating groove 13C of the second insulator 13 and drawn from the connector 11 in the −Y direction as shown in FIG. 10.

According to Embodiment 1, the conductor portion 31A is sandwiched between the two parts of the flexible conductor 21B thus folded, thereby enabling to achieve a connector assembly that is small, specifically, thin, while electrically connecting the conductor portion 31A of the coated electric wire 31 to the flexible conductor 21B exposed on the surface of the sheet type conductive member 21 with high reliability.

Embodiment 2

Figure 11:
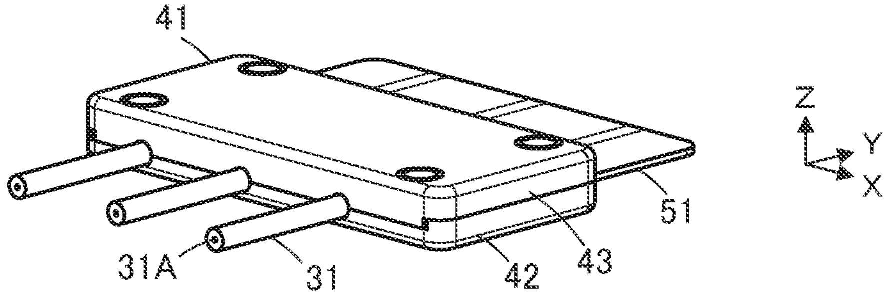
FIG. 11 is a perspective view showing a connector assembly according to Embodiment 2.

FIG. 11 shows a connector assembly according to Embodiment 2. The connector assembly is obtained by connecting conductor portions 31A of a plurality of coated electric wires 31 to a sheet type conductive member 51 by means of a connector 41.

The connector 41 includes a first insulator 42 and a second insulator 43 each made of an insulating resin material.

Figure 12:
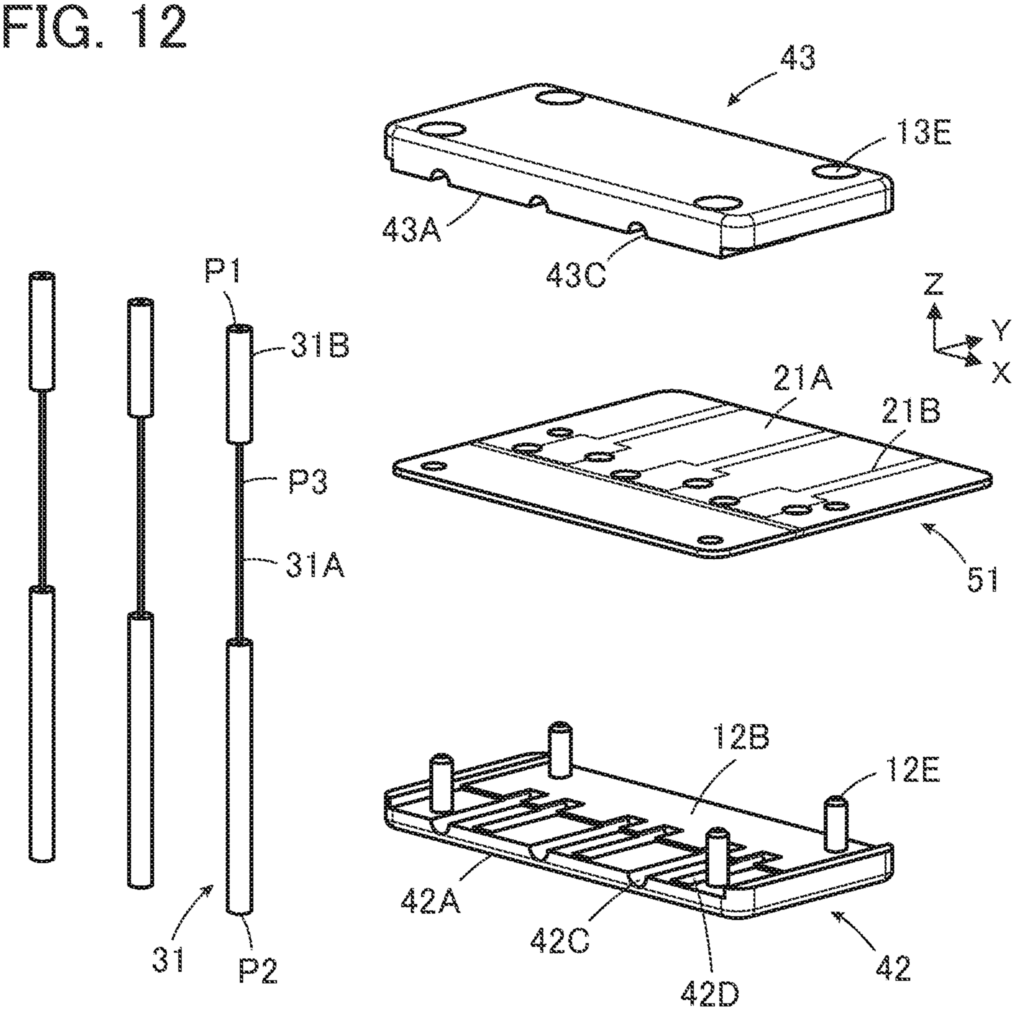
FIG. 12 is an assembly view of the connector assembly according to Embodiment 2.

FIG. 12 shows an assembly view of the connector assembly according to Embodiment 2.

The first insulator 42 has the same configuration as that of the first insulator 12 used in Embodiment 1. That is, the second insulator 42 includes a flat plate portion 42A of rectangular shape extending along an XY plane, and the first retaining surface 12B facing in the +Z direction is formed at a +Y direction-side portion of the flat plate portion 42A. A plurality of electric wire accommodating grooves 42C and 42D extending to the inside of the first retaining surface 12B are formed at a −Y direction-side portion of the flat plate portion 42A as with the electric wire accommodating grooves 12C and 12D of the first insulator 12. The electric wire accommodating grooves 42C and 42D each have a groove width and a groove depth that allow the insulating coating portion 31B of the coated electric wire 31 to be accommodated in the grooves 42C and 42D.

In addition, the flat plate portion 42A is provided with the plurality of bosses 12E.

The second insulator 43 has the same configuration as that of the second insulator 13 used in Embodiment 1. That is, the second insulator 43 includes a flat plate portion 43A of rectangular shape extending along an XY plane, and a second retaining surface (not shown) facing in the −Z direction is formed at a +Y direction-side portion of the flat plate portion 43A. In addition, a plurality of electric wire accommodating grooves 43C and a plurality of electric wire accommodating grooves (not shown) corresponding to the electric wire accommodating grooves 42C and 42D of the first insulator 42 are formed at a −Y direction-side portion and in the surface, facing in the −Z direction, of the flat plate portion 43A. The electric wire accommodating grooves 43C and the electric wire accommodating groove not shown each have a groove width and a groove depth that allow the insulating coating portion 31B of the coated electric wire 31 to be accommodated in the groove 43C and the groove not shown.

In addition, the flat plate portion 43A is provided with the plurality of fixing holes 13E.

The sheet type conductive member 51 is obtained by forming the plurality of flexible conductors 21B on the surface of the sheet type insulating base 21A as with the sheet type conductive member 21 in Embodiment 1.

The coated electric wires 31 herein have the same configuration as that of the coated electric wires 31 used in Embodiment 1 except that the coated electric wires 31 herein each have the conductor exposed portion P3 longer in the Z direction than the conductor exposed portion P3 in the coated electric wire 31 used in Embodiment 1.

Figure 13:
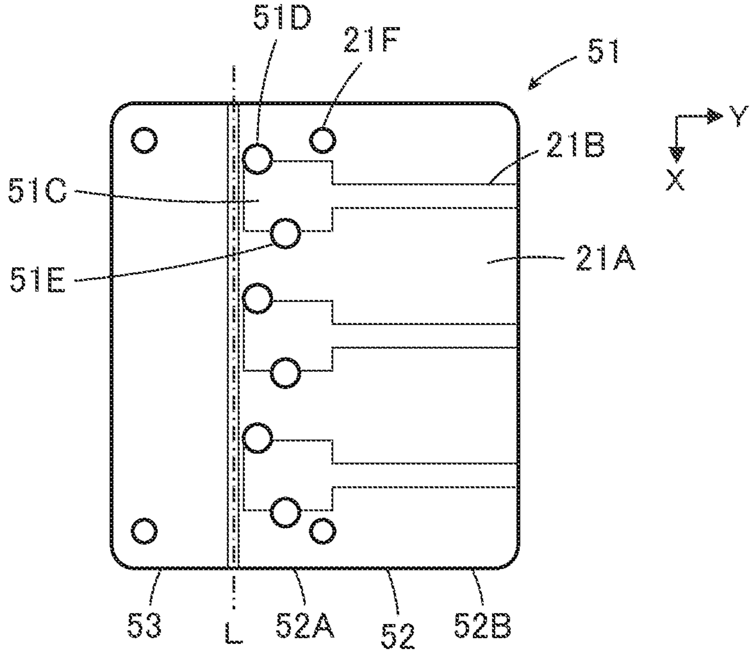
FIG. 13 is a plan view showing a sheet type conductive member used in Embodiment 2.

As shown in FIG. 13, the sheet type conductive member 51 includes a first sheet portion 52 and a second sheet portion 53 disposed on the −Y direction side of the first sheet portion 52, a retained portion 52A is disposed at a −Y direction-side portion of the first sheet portion 52, and an extension portion 52B extending toward the +Y direction is formed on the +Y direction side of the retained portion 52A. The second sheet portion 53 is joined to the retained portion 52A of the first sheet portion 52 via the folding-back line L extending in the X direction.

The flexible conductors 21B are formed only on a surface of the first sheet portion 52 on the +Z direction side and are not formed in the second sheet portion 53.

Each flexible conductor 21B extends in the Y direction and is provided at its −Y directional end with an electric wire connecting region 51C of substantially rectangular shape disposed at the retained portion 52A. A pair of electric wire inserting holes 51D and 51E penetrating the sheet type conductive member 51 are formed on opposite sides in the X direction of the electric wire connecting region 51C near the folding-back line L. The pair of electric wire inserting holes 51D and 51E are disposed at positions inclined with respect to the folding-back line L, i.e., Y directional positions different from each other, and are each formed from a round hole that is sized so as to allow the insulating coating portion 31B of the coated electric wire 31 to pass through it.

The pair of electric wire inserting holes 51D and 51E are each sized to allow the insulating coating portion 31B of the coated electric wire 31 to pass through it. In addition, the pair of electric wire inserting holes 51D and 51E are situated to be in contact with the electric wire connecting region 51C on the opposite sides in the X direction of the electric wire connecting region 51C, and the flexible conductor 21B forming the electric wire connecting region 51C is disposed between the pair of electric wire inserting holes 51D and 51E.

A plurality of the pairs of electric wire inserting holes 51D and 51E as above are formed in the sheet type conductive member 51 to correspond to the coated electric wires 31.

Further, the retained portion 52A and the second sheet portion 53 of the sheet type conducive member 51 are provided with the plurality of through-holes 21F.

Figure 14:
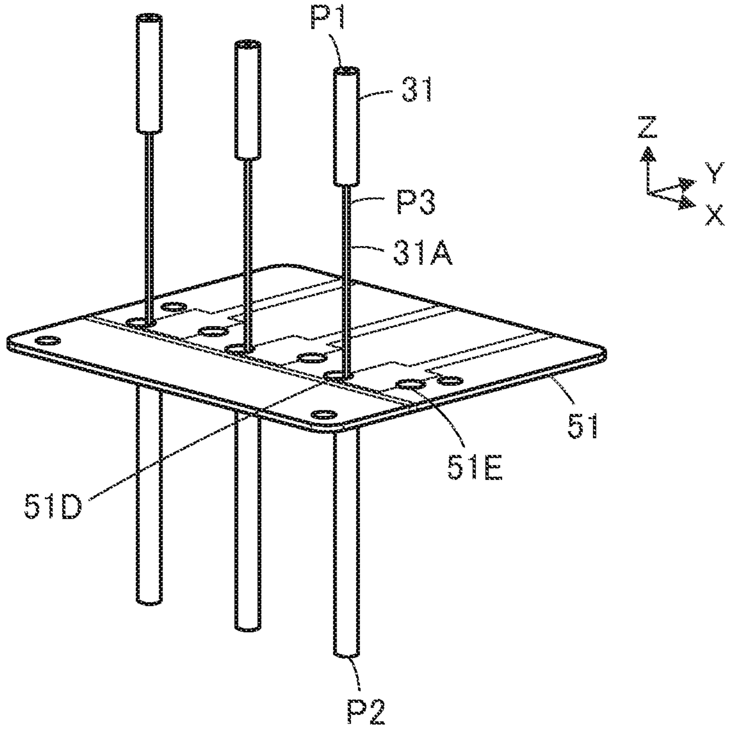
FIG. 14 is a perspective view showing a state where electric wires are separately passed through electric wire inserting holes of the sheet type conductive member in Embodiment 2.

When the connector assembly is assembled, first, as shown in FIG. 14, each of the coated electric wires 31 is passed through the electric wire inserting hole 51D of the corresponding pair of the electric wire inserting holes 51D and 51E of the sheet type conductive member 51. At this time, the coated electric wire 31 is disposed such that a part thereof from the conductor exposed portion P3 to the tip portion P1 is situated on the +Z direction side of the sheet type conductive member 51 and that a part thereof on the base end portion P2 side of the conductor exposed portion P3 is situated on the −Z direction side of the sheet type conductive member 51.

Figure 15:
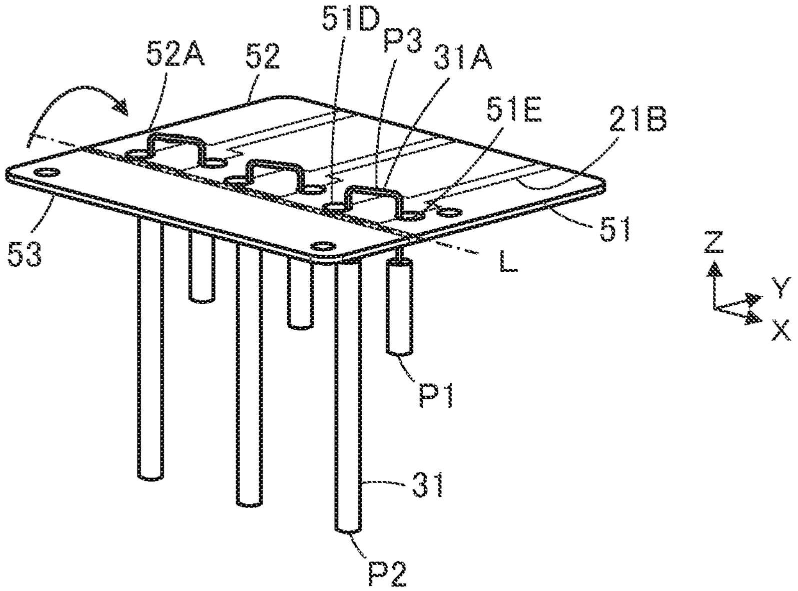
FIG. 15 is a perspective view showing a state where each of the electric wires is sequentially passed through a pair of electric wire inserting holes of the sheet type conductive member in Embodiment 2.

Next, the conductor exposed portion P3 is bent, and the tip portion P1 of each of the coated electric wires 31 is passed through the electric wire inserting hole 51E that is the other of the corresponding pair of electric wire inserting holes 51D and 51E from the +Z direction. When each of the coated electric wires 31 is sequentially passed through the corresponding pair of electric wire inserting holes 51D and 51E in this manner, as shown in FIG. 15, the tip portion P1 of each of the coated electric wires 31 is situated on the −Z direction side of the sheet type conductive member 51, and the conductor portion 31A exposed at the conductor exposed portion P3 is situated between the pair of electric wire inserting holes 51D and 51E on the surface of the sheet type conductive member 51 on the +Z direction side.

Figure 16:
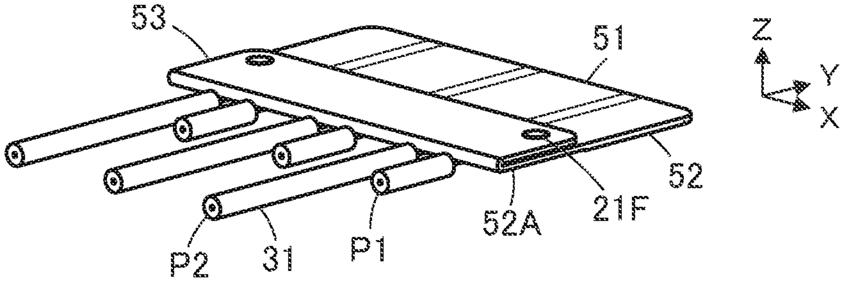
FIG. 16 is a perspective view showing a state where a second sheet portion of the sheet type conductive member in Embodiment 2 is folded back.

By folding back, in this state, the second sheet portion 53 of the sheet type conductive member 51 along the folding-back line L extending in X direction, as shown in FIG. 16, the second sheet portion 53 is rotated by 180 degrees around the folding-back line L so as to be superposed on the retained portion 52A of the first sheet portion 52. At this time, with folding back of the second sheet portion 53, the coated electric wires 31 passed through the plurality of pairs of electric wire inserting holes 51D and 51E are rotated by 90 degrees around the folding-back line L, and the tip portion P1 and the base end portion P2 of each of the coated electric wires 31 extend from the sheet type conductive member 51 toward the −Y direction.

Figure 17:
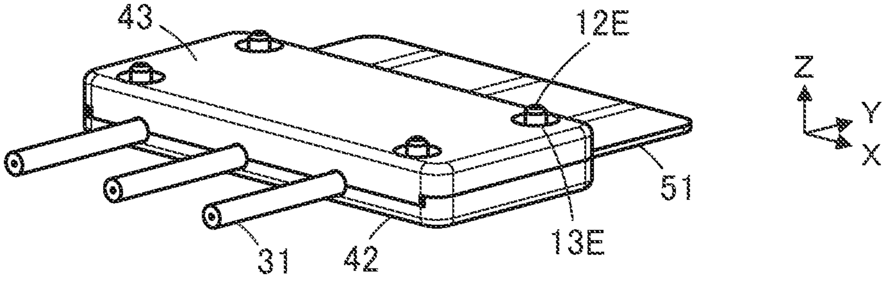
FIG. 17 is a perspective view showing a state where the sheet type conductive member in Embodiment 2 is sandwiched between a first insulator and a second insulator.

Thereafter, with the bosses 12E of the first insulator 42 being separately passed through the through-holes 21F of the sheet type conductive member 51 from the −Z direction and further passed through the fixing holes 13E of the second insulator 43, the sheet type conductive member 51 is sandwiched between the first insulator 42 and the second insulator 43 as shown in FIG. 17.

Tips of the bosses 12E projecting on the +Z direction side of the second insulator 43 are then thermally deformed, whereby the first insulator 42 and the second insulator 43 are fixed to each other to form the connector 41. Thus, the assembling operation of the connector assembly shown in FIG. 11 is completed.

Figure 18:
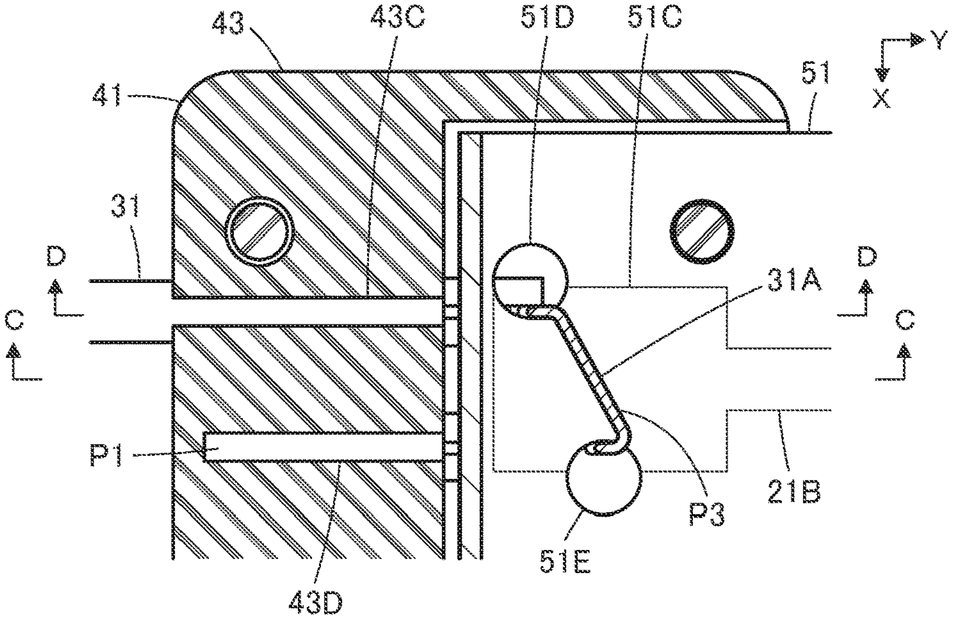
FIG. 18 is a partial cross-sectional plan view showing a state where a conductor portion of the electric wire and a flexible conductor make contact with each other in the connector assembly of Embodiment 2.
Figure 19:
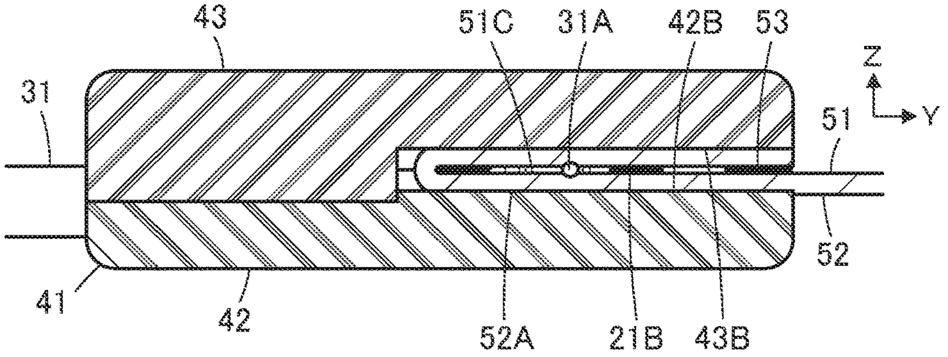
FIG. 19 is a cross-sectional side view of the connector assembly cut along line C-C of FIG. 18.

FIG. 18 shows the inside of the connector assembly. Since the electric wire connecting region 51C of the flexible conductor 21B is formed between the pair of electric wire inserting holes 51D and 51E, the conductor portion 31A exposed at the conductor exposed portion P3 situated between the pair of electric wire inserting holes 51D and 51E is disposed on the electric wire connecting region 51C, and as shown in FIG. 19, with folding back of the second sheet portion 53, the retained portion 52A of the first sheet portion 52 and the second sheet portion 53 being superposed on each other are sandwiched between the first retaining surface 42B of the first insulator 42 and the second retaining surface 43B of the second insulator 43. In this manner, the flexible conductor 21B forming the electric wire connecting region 51C makes contact with the conductor portion 31A of the coated electric wire 31 with predetermined contact pressure and is electrically connected to the conductor portion 31A.

Similarly, the plurality of flexible conductors 21B are electrically connected separately to the conductor portions 31A of the plurality of coated electric wires 31.

In addition, as shown in FIG. 18, the tip portion P1 of the coated electric wire 31 projects in the −Y direction from the electric wire inserting hole 51E of the sheet type conductive member 51 and is accommodated in the electric wire accommodating groove 42D of the first insulator 42 and the electric wire accommodating groove 43D of the second insulator 43 in the connector 41.

Figure 20:
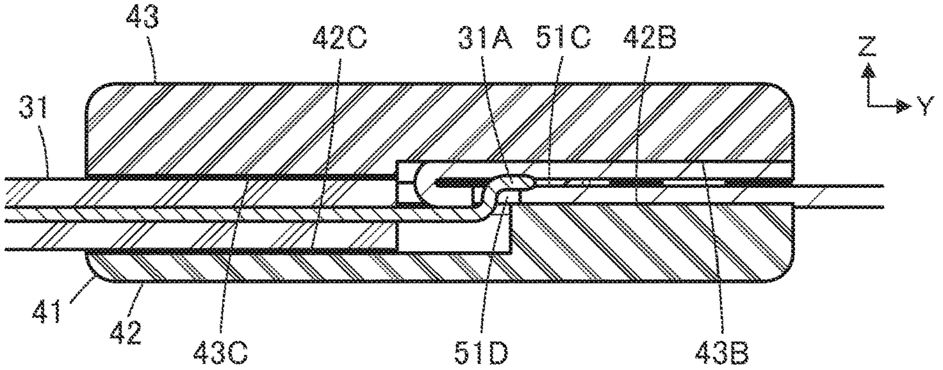
FIG. 20 is a cross-sectional side view of the connector assembly cut along line D-D of FIG. 18.

On the other hand, the part of the coated electric wire 31 on the base end portion P2 side projects in the −Y direction from the electric wire inserting hole 51D of the sheet type conductive member 51 and is accommodated in the electric wire accommodating groove 42C of the first insulator 42 and the electric wire accommodating groove 43C of the second insulator 43 and drawn from the connector 41 in the −Y direction as shown in FIG. 20.

Also in Embodiment 2, the conductor portion 31A exposed at the conductor exposed portion P3 of the coated electric wire 31 makes contact with the electric wire connecting region 51C of the corresponding flexible conductor 21B, thereby enabling to achieve a connector assembly that is small, specifically, thin, while electrically connecting the conductor portion 31A of the coated electric wire 31 to the flexible conductor 21B exposed on the surface of the sheet type conductive member 51 with high reliability.

In addition, since the pair of electric wire inserting holes 51D and 51E of the sheet type conductive member 51 are disposed at the Y directional positions different from each other, the conductor portion 31A situated between the electric wire inserting holes 51D and 51E makes contact with the flexible conductor 21B over a distance longer than that in Embodiment 1, thereby improving the reliability of electrical connection.

Further, in each of the plurality of pairs of the electric wire inserting holes 51D and 51E of the sheet type conductive member 51, the electric wire inserting holes 51D and 51E are disposed at the positions inclined with respect to the folding-back line L, so that the conductor portions 31A of the adjacent coated electric wires 31 are disposed with a distance therebetween in the Y direction, whereby short-circuit between the conductor portions 31A can be effectively prevented. In addition, the alignment pitch in the X direction of the coated electric wires 31 can also be narrowed.

Embodiment 3

Figure 21:
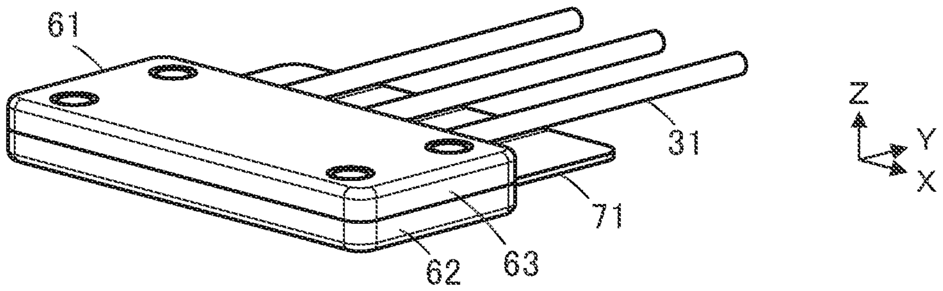
FIG. 21 is a perspective view showing a connector assembly according to Embodiment 3.

FIG. 21 shows a connector assembly according to Embodiment 3. The connector assembly is obtained by connecting conductor portions 31A of a plurality of coated electric wires 31 to a sheet type conductive member 71 by means of a connector 61.

The connector 61 includes a first insulator 62 and a second insulator 63 each made of an insulating resin material.

Figure 22:
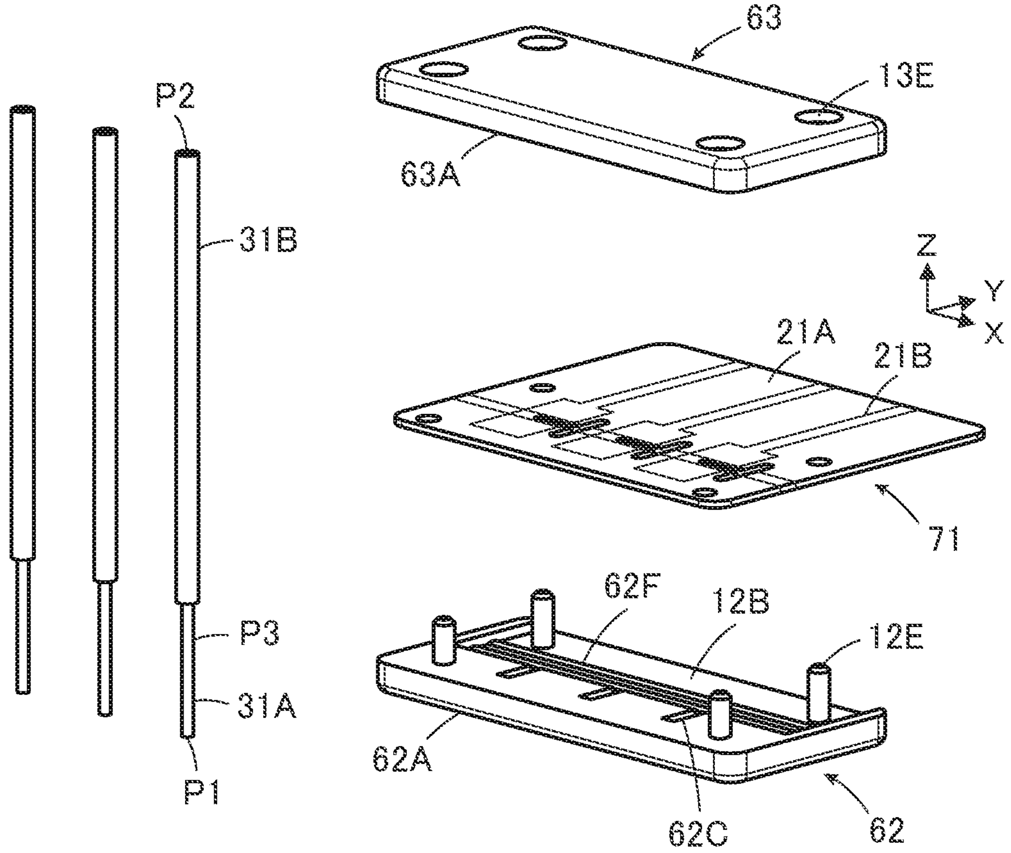
FIG. 22 is an assembly view of the connector assembly according to Embodiment 3.

FIG. 22 shows an assembly view of the connector assembly according to Embodiment 3.

As with the first insulator 12 used in Embodiment 1, the first insulator 62 includes a flat plate portion 62A of rectangular shape extending along an XY plane, and the first retaining surface 12B facing in the +Z direction is formed at a +Y direction-side portion of the flat plate portion 62A. A plurality of electric wire accommodating grooves 62C are formed at a −Y direction-side portion of the flat plate portion 62A to extend in the Y direction from the first retaining surface 12B and terminate in front of a −Y directional end of the flat plate portion 62A. The electric wire accommodating grooves 62C each have a groove width and a groove depth that allow the conductor portion 31A of the coated electric wire 31 to be accommodated in the groove 62C.

In addition, the flat plate portion 62A is provided with the plurality of bosses 12E.

Further, a plurality of ribs 62F are formed on the first retaining surface 12B to extend in the X direction and project in the +Z direction.

As with the second insulator 13 used in Embodiment 1, the second insulator 63 includes a flat plate portion 63A of rectangular shape extending along an XY plane, and a second retaining surface (not shown) facing in the −Z direction is formed at a +Y direction-side portion of the flat plate portion 63A. In addition, a plurality of electric wire accommodating grooves (not shown) corresponding to the plurality of electric wire accommodating grooves 62C of the first insulator 62 are formed at a −Y direction-side portion and in a surface, facing in the −Z direction, of the flat plate portion 63A. These electric wire accommodating grooves not shown each have a groove width and a groove depth that allow the conductor portion 31A of the coated electric wire 31 to be accommodated in the groove not shown.

In addition, the flat plate portion 63A is provided with the plurality of fixing holes 13E.

Further, ribs (not shown) are formed on the second retaining surface to extend in the X direction and project in the −Z direction.

The sheet type conductive member 71 is obtained by forming the plurality of flexible conductors 21B on the surface of the sheet type insulating base 21A as with the sheet type conductive member 21 in Embodiment 1.

The coated electric wires 31 in assembling the connector assembly are each disposed in such a position as to extend in the Z direction such that the tip portion P1 faces in the −Z direction and that the base end portion P2 faces in the +Z direction. In addition, the conductor exposed portion P3 is formed to extend from the tip portion P1 of each of the coated electric wires 31 in the +Z direction over a predetermined Z directional length. At the conductor exposed portion P3, the insulating coating portion 31B is removed so that the conductor portion 31A is exposed.

Figure 23:
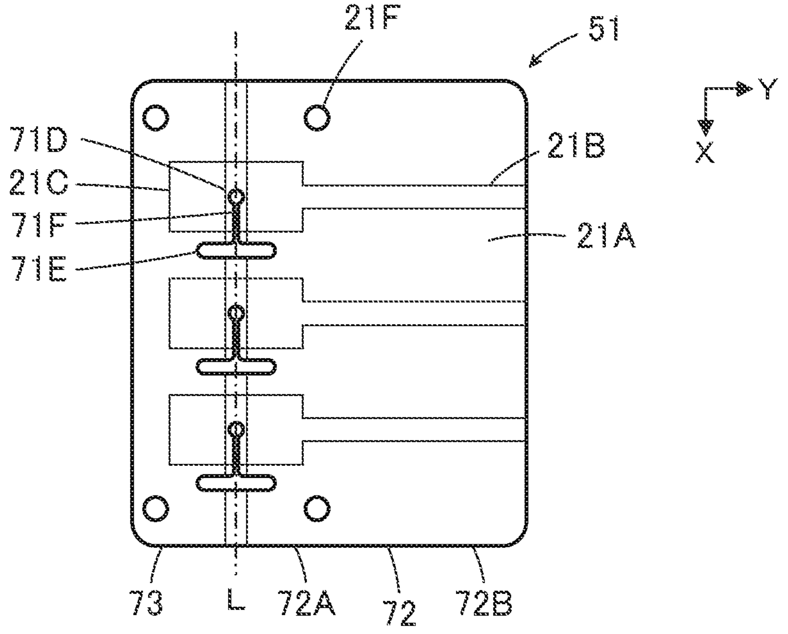
FIG. 23 is a plan view showing a sheet type conductive member used in Embodiment 3.

As shown in FIG. 23, the sheet type conductive member 71 includes a first sheet portion 72 and a second sheet portion 73 disposed on the −Y direction side of the first sheet portion 72, a retained portion 72A is disposed in a −Y direction-side portion of the first sheet portion 72, and an extension portion 72B is formed on the +Y direction side of the retained portion 72A to extend toward the +Y direction. The second sheet portion 73 is joined to the retained portion 72A of the first sheet portion 72 via the folding-back line L extending in the X direction.

The flexible conductors 21B are each disposed continuously from the second sheet portion 73 to the retained portion 72A and the extension portion 72B of the first sheet portion 72 beyond the folding-back line L.

Each flexible conductor 21B has the electric wire connecting region 21C of substantially rectangular shape at a position overlapping the folding-back line L, and one electric wire inserting hole 71D penetrating the sheet type conductive member 71 is formed at a center part of the electric wire connecting region 21C situated on the folding-back line L.

In addition, one electric wire guiding hole 71E is formed on the +X direction side of the electric wire connecting region 21C to penetrate the sheet type conductive member 71. The electric wire guiding hole 71E extends in the Y direction from the second sheet portion 73 to the retained portion 72A beyond the folding-back line L.

Further, a slit type communication opening portion 71F penetrating the sheet type conductive member 71 is formed between the electric wire inserting hole 71D and the electric wire guiding hole 71E such that the electric wire inserting hole 71D and the electric wire guiding hole 71E communicate with each other in the X direction along the folding-back line L.

Figure 24:
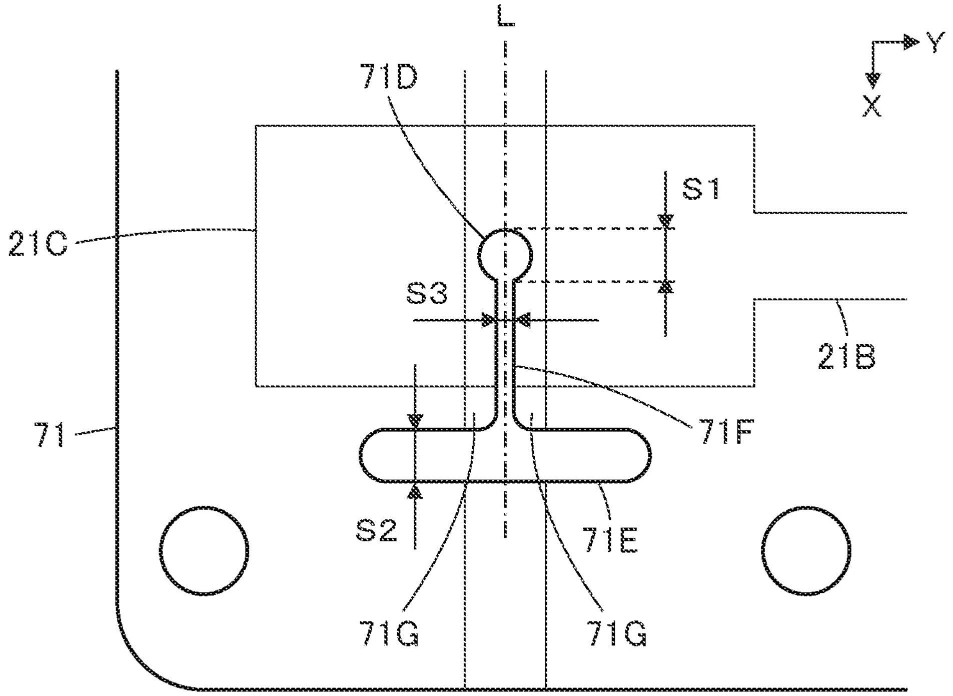
FIG. 24 is an enlarged view of a main part of FIG. 23.

As shown in FIG. 24, the electric wire inserting hole 71D is formed from a round hole having a size corresponding to the diameter of the conductor portion 31A of the coated electric wire 31, specifically, a diameter S1 slightly larger than the diameter of the conductor portion 31A. The electric wire guiding hole 71E is formed from a long hole having a width S2 substantially equal to the diameter S1 of the electric wire inserting hole 71D. The communication opening portion 71F has an opening width S3 having a dimension smaller than the diameter of the conductor portion 31A of the coated electric wire 31.

The communication opening portion 71F is connected to the electric wire guiding hole 71E, whereby a T-shaped opening is formed in the sheet type conductive member 71 so as to be in contact with a pair of corner portions 71G constituted of the sheet type conductive member 71.

Figure 25:
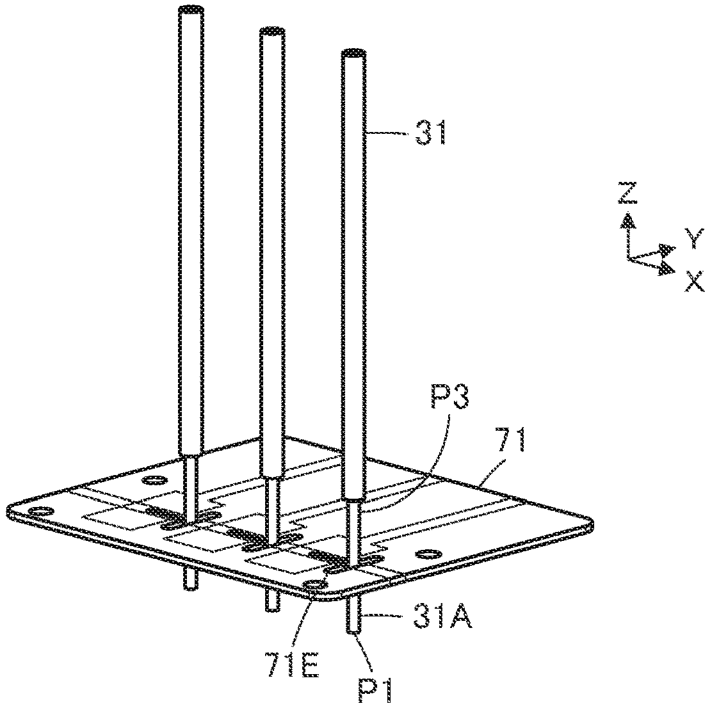
FIG. 25 is a perspective view showing a state where electric wires are separately passed through electric wire guiding holes of the sheet type conductive member in Embodiment 3.

When the connector assembly is assembled, first, as shown in FIG. 25, the conductor portion 31A of the conductor exposed portion P3 formed at the tip portion P1 of each of the coated electric wires 31 is passed through the corresponding electric wire guiding hole 71E of the sheet type conductive member 71 from the +Z direction. At this time, the conductor portion 31A is passed through the electric wire guiding hole 71E such that −Z and +Z direction-side portions of the conductor exposed portion P3 are situated on the −Z and +Z direction sides of the sheet type conductive member 71, respectively.

Figure 26:
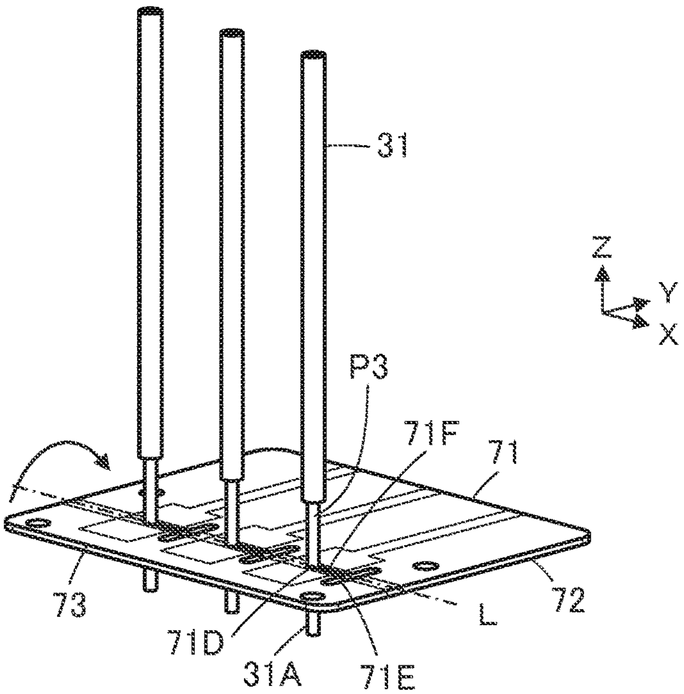
FIG. 26 is a perspective view showing a state where the electric wires are separately slid to electric wire inserting holes of the sheet type conductive member in Embodiment 3.

Next, as shown in FIG. 26, each of the coated electric wires 31 is slid in the −X direction relatively to the sheet type conductive member 71 along the corresponding communication opening portion 71F, whereby the conductor portion 31A exposed at the conductor exposed portion P3 of each of the coated electric wires 31 is passed through the corresponding electric wire inserting hole 71D.

At this time, while the communicating opening hole 71F has the opening width S3 having the dimension smaller than the diameter of the conductor portion 31A, part of the sheet type conductive member 71 around the communicating opening hole 71E is elastically bent, whereby the conductive portion 31A can be relatively slid to the electric wire inserting hole 71D.

Figure 27:
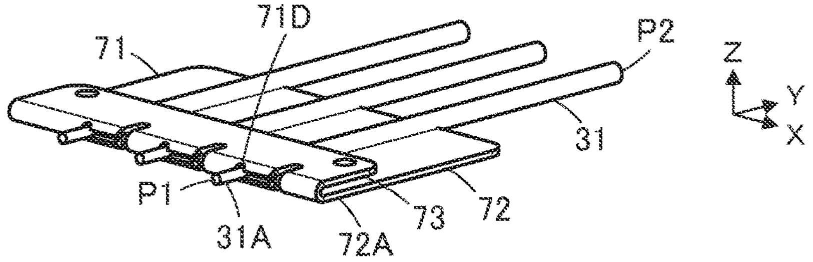
FIG. 27 is a perspective view showing a state where a second sheet portion of the sheet type conductive member in Embodiment 3 is folded back.

By folding back, in this state, the second sheet portion 73 of the sheet type conductive member 71 along the folding-back line L extending in the X direction, the second sheet portion 73 is rotated by 180 degrees around the folding-back line L so as to be superposed on the retained portion 72A of the first sheet portion 72 as shown in FIG. 27.

With folding back of the second sheet portion 73, the coated electric wires 31 having the conductor portions 31A passed through the electric wire inserting holes 71D are rotated by 90 degrees around the folding-back line L, the tip portion P1 of each of the coated electric wires 31 projects from the sheet type conductive member 71 toward the −Y direction, and the base end portion P2 extends from the sheet type conductive member 71 toward the +Y direction.

Figure 28:
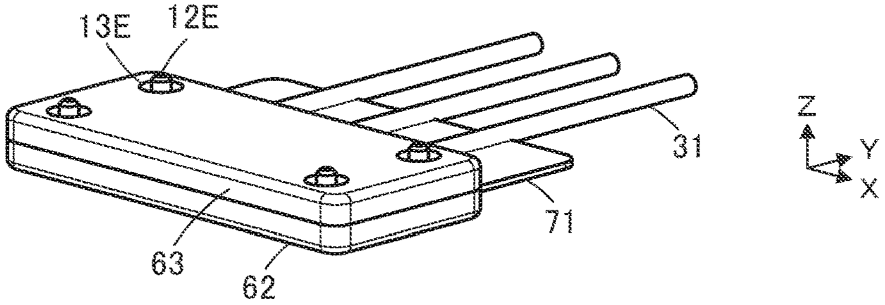
FIG. 28 is a perspective view showing a state where the sheet type conductive member in Embodiment 3 is sandwiched between a first insulator and a second insulator.

Thereafter, with the bosses 12E of the first insulator 62 being separately passed through the through-holes 21F of the sheet type conductive member 71 from the −Z direction and further passed through the fixing holes 13E of the second insulator 63, the sheet type conductive member 71 is sandwiched between the first insulator 62 and the second insulator 63 as shown in FIG. 28.

Tips of the bosses 12E projecting on the +Z direction side of the second insulator 63 are then thermally deformed, whereby the first insulator 62 and the second insulator 63 are fixed to each other to form the connector 61. Thus, the assembling operation of the connector assembly shown in FIG. 21 is completed.

Figure 29:
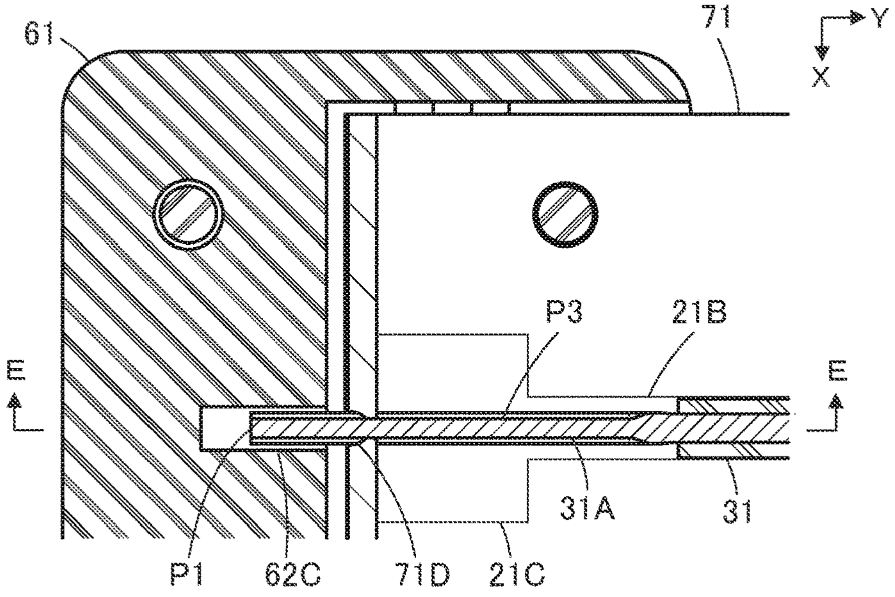
FIG. 29 is a partial cross-sectional plan view showing a state where a conductor portion of the electric wire and a flexible conductor make contact with each other in the connector assembly of Embodiment 3.
Figure 30:
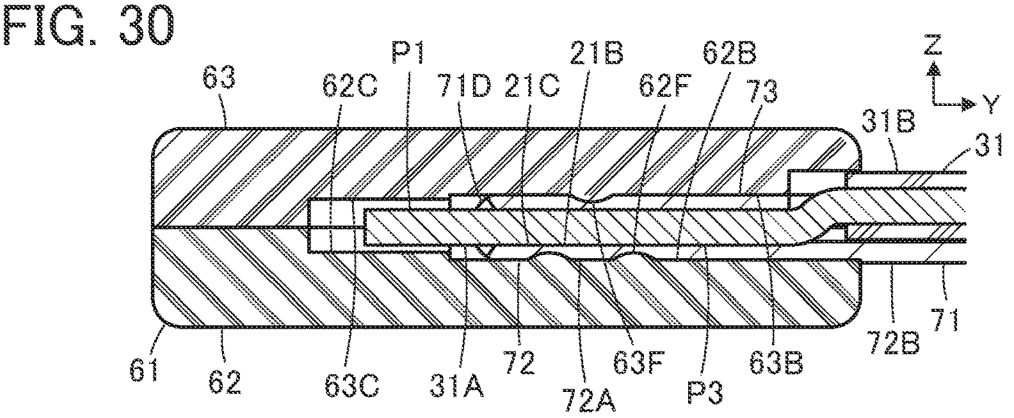
FIG. 30 is a cross-sectional side view of the connector assembly cut along line E-E of FIG. 29.

FIG. 29 shows the inside of the connector assembly. Since the flexible conductor 21B has the electric wire connecting region 21C of substantially rectangular shape at the position overlapping the folding-back line L, with the second sheet portion 23 being folded back, the flexible conductor 21B forming the electric wire connecting region 21C is folded in two parts, and the conductor portion 31A exposed at the conductor exposed portion P3 of the coated electric wire 31 passed through the electric wire inserting hole 71D is sandwiched between the two parts of the flexible conductor 21B thus folded as shown in FIG. 30. In this manner, the flexible conductor 21B forming the electric wire connecting region 21C makes contact with the conductor portion 31A of the coated electric wire 31 with predetermined contact pressure and is electrically connected to the conductor portion 31A.

Similarly, the plurality of flexible conductors 21B are electrically connected separately to the conductor portions 31A of the plurality of coated electric wires 31.

The retained portion 72A of the first sheet portion 72 and the second sheet portion 73 of the sheet type conductive member 71 being superposed on each other are sandwiched between the first retaining surface 62B of the first insulator 62 and the second retaining surface 63B of the second insulator 63, and the flexible conductor 21B forming the electric wire connecting region 21C is tightly attached to the conductor portion 31A by means of the ribs 62F formed on the first retaining surface 62B and the ribs 63F formed on the second retaining surface 63B. This improves the reliability of electric connection between the flexible conductor 21B and the conductor portion 31A.

In addition, the conductor portion 31A exposed at the tip portion P1 of the coated electric wire 31 projecting from the sheet type conductive member 71 toward the −Y direction is accommodated in the electric wire accommodating groove 62C of the first insulator 62 and the electric wire accommodating groove 63C of the second insulator 63 in the connector 61.

On the other hand, a part of the coated electric wire 31 on the base end portion P2 side along with the sheet type conductive member 71 is drawn from the connector 61 in the +Y direction. At this time, as shown in FIG. 30, the conductor portion 31A is bent in the Z direction at a +Y directional end of the connector 61, whereby the insulating coating portion 31B of the coated electric wire 31 is situated on a +Z directional surface of the extension portion 72B of the sheet type conductive member 71. That is, both the insulating coating portion 31B of the coated electric wire 31 and the extension portion 72B of the sheet type conductive member 71 can extend in the +Y direction without interfering with each other in the Z direction.

Thus, also in Embodiment 3, the conductor portion 31A exposed at the conductor exposed portion P3 of the coated electric wire 31 makes contact with the electric wire connecting region 21C of the corresponding flexible conductor 21B, thereby enabling to achieve a connector assembly that is small, specifically, thin, while electrically connecting the conductor portion 31A of the coated electric wire 31 to the flexible conductor 21B exposed on the surface of the sheet type conductive member 71 with high reliability.

In addition, since the electric wire guiding hole 71E constituted of a long hole is formed to be connected to the electric wire inserting hole 71D of the sheet type conductive member 71 via the communication opening portion 71F, the conductor portion 31A of the coated electric wire 31 is passed through the electric wire guiding hole 71E and then slid along the communication opening portion 71F, whereby the conductor portion 31A can be passed through the electric wire inserting hole 71D, thus improving the operability in assembling the connector assembly.

Embodiment 4

Figure 31:
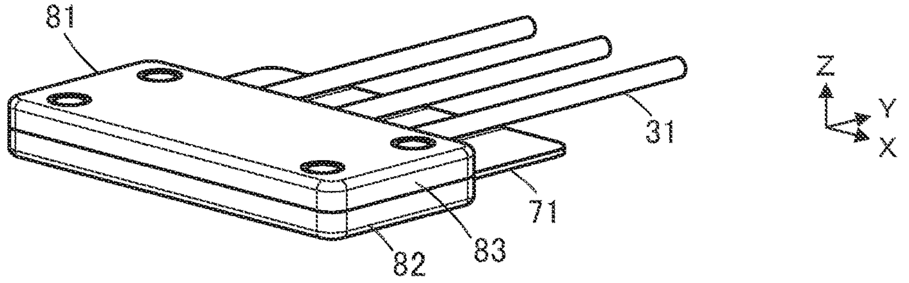
FIG. 31 is a perspective view showing a connector assembly according to Embodiment 4.

FIG. 31 shows a connector assembly according to Embodiment 4. The connector assembly is obtained by connecting conductor portions 31A of a plurality of coated electric wires 31 to a sheet type conductive member 71 by means of a connector 81.

The connector 81 includes a first insulator 82 and a second insulator 83 each made of an insulating resin material.

Figure 32:
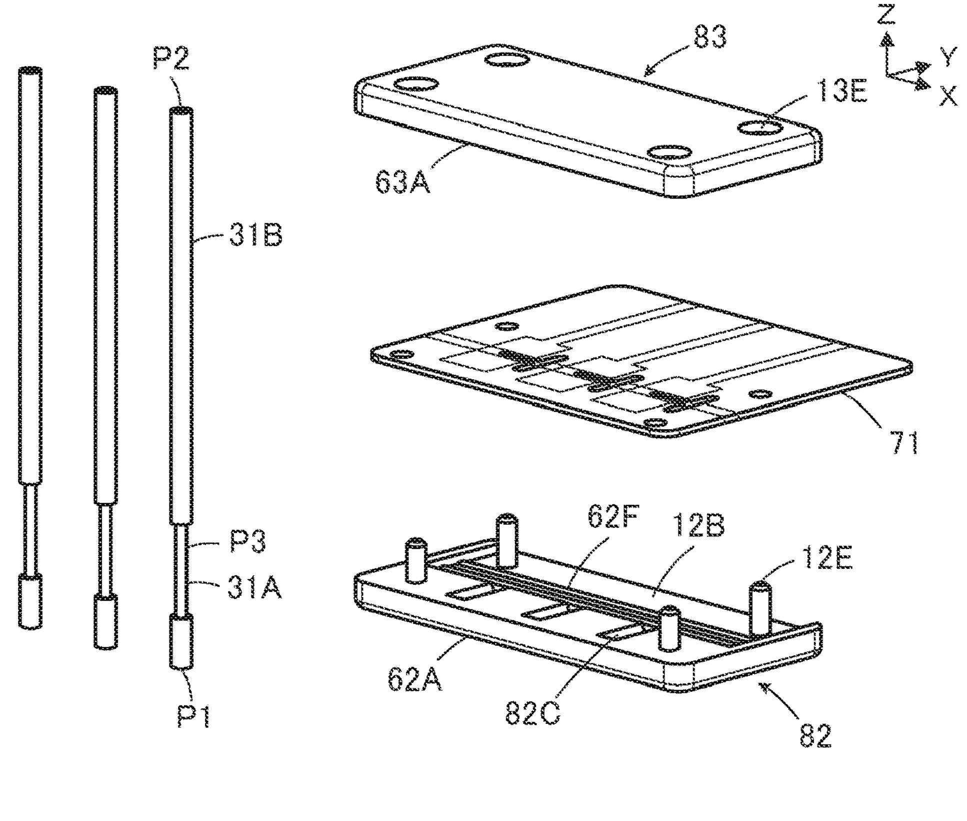
FIG. 32 is an assembly view of the connector assembly according to Embodiment 4.

FIG. 32 shows an assembly view of the connector assembly according to Embodiment 4.

The first insulator 82 is obtained by forming a plurality of electric wire accommodating grooves 82C in which the insulating coating portions 31B of the coated electric wires 31 are accommodated, instead of the plurality of electric wire accommodating grooves 62C in which the conductor portions 31A of the coated electric wires 31 are accommodated, in the flat plate portion 62A in the first insulator 62 used in Embodiment 3, and otherwise has the same configuration as the first insulator 62 in Embodiment 3.

The second insulator 83 is obtained by forming a plurality of electric wire accommodating grooves (not shown) in which the insulating coating portions 31B of the coated electric wires 31 are accommodated, instead of the plurality of electric wire accommodating grooves in which the conductor portions 31A of the coated electric wires 31 are accommodated, in the flat plate portion 63A in the second insulator 63 used in Embodiment 3, and otherwise has the same configuration as the second insulator 63 in Embodiment 3.

The sheet type conductive member 71 herein is the same as that used in Embodiment 3.

Also in Embodiment 4, as with Embodiment 3, the coated electric wires 31 in assembling the connector assembly are each disposed in such a position as to extend in the Z direction such that the tip portion P1 faces in the −Z direction and that the base end portion P2 faces in the +Z direction. However, the insulating coating portion 31B is not removed and remains at the tip portion P1 of each coated electric wire 31, and the conductor exposed portion P3, in which the conductor portion 31A is exposed over a predetermined Z directional length by removing the insulating coating portion 31B, is formed at a position away from the tip portion P1 in the +Z direction by a predetermined distance.

When the connector assembly is assembled, as with Embodiment 3, first, the tip portion P1 of each of the coated electric wires 31 is passed through the corresponding electric wire guiding hole 71E of the sheet type conductive member 71 from the +Z direction. At this time, since the T-shaped opening is formed by connecting the communication opening portion 71F to the electric wire guiding hole 71E of the sheet type conductive member 71 as shown in FIG. 24, when the tip portion P1 of the coated electric wire 31 having the insulating coating portion 31B having the diameter larger than that of the conductor portion 31A is pressed against the electric wire guiding hole 71E, the pair of corners 71G contacting the T-shaped opening are bent so that the tip portion P1 of the coated electric wire 31 is passed through the electric wire guiding hole 71E, and the conductor portion 31A exposed at the conductor exposed portion P3 can be situated at the electric wire guiding hole 71E.

As with Embodiment 3, the conductor portion 31A of the conductor exposed portion P3 is then slid from the electric wire guiding hole 71E to the electric wire inserting hole 71D along the communication opening portion 71F, and the second sheet portion 73 of the sheet type conductive member 71 is folded back along the folding-back line L. In this manner, the tip portion P1 of each of the coated electric wires 31 projects from the sheet type conductive member 71 toward the −Y direction.

Thereafter, the bosses 12E of the first insulator 82 are passed through the through-holes 21F of the sheet type conductive member 71 from the −Z direction and further passed through the fixing holes 13E of the second insulator 83, and the first insulator 82 and the second insulator 83 are fixed to each other to form the connector 81. Thus, the assembling operation of the connector assembly shown in FIG. 31 is completed.

Figure 33:
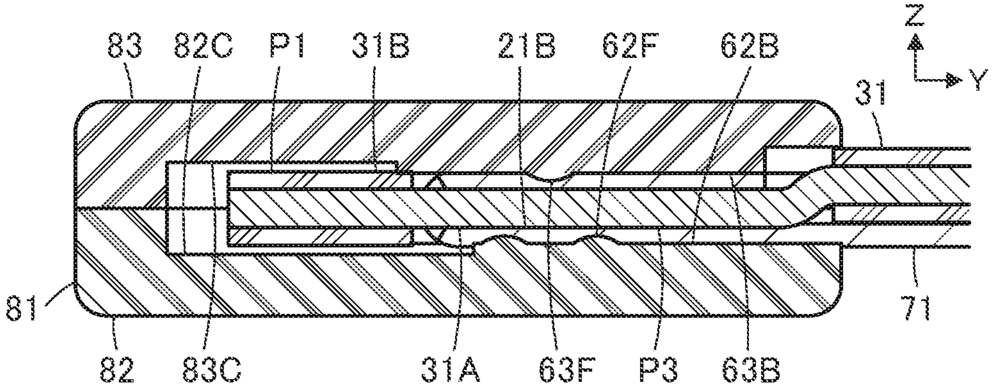
FIG. 33 is a cross-sectional side view of the connector assembly of Embodiment 4.

As shown in FIG. 33, as with Embodiment 3, the conductor portion 31A exposed at the conductor exposed portion P3 of the coated electric wire 31 is sandwiched between the two parts of the flexible conductor 21B thus folded. The flexible conductor 21B is then tightly attached and electrically connected to the conductor portion 31A by the ribs 62F formed on the first retaining surface 62B of the first insulator 82 and the ribs 63F formed on the second retaining surface 63B of the second insulator 83.

Similarly, the plurality of flexible conductors 21B are electrically connected separately to the conductor portions 31A of the plurality of coated electric wires 31.

The tip portion P1 of the coated electric wire 31 projecting from the sheet type conductive member 71 toward the −Y direction is accommodated in the electric wire accommodating groove 82C of the first insulator 82 and the electric wire accommodating groove 83C of the second insulator 83 in the connector 81.

Thus, also in Embodiment 4, the conductor portion 31A exposed at the conductor exposed portion P3 of the coated electric wire 31 makes contact with the electric wire connecting region 21C of the corresponding flexible conductor 21B, thereby enabling to achieve a connector assembly that is small, specifically, thin, while electrically connecting the conductor portion 31A of the coated electric wire 31 to the flexible conductor 21B exposed on the surface of the sheet type conductive member 71 with high reliability.

In addition, since the conductor portion 31A at the tip portion P1 of the coated electric wire 31 projecting from the sheet type conductive member 71 toward the −Y direction is covered with the insulating coating portion 31B, short-circuit between the conductor portions 31A of the adjacent coated electric wires 31 can be prevented. Further, even when the conductor portion 31A is formed from a so-called stranded wire constituted of plural conductors being stranded, the insulating coating portion 31B covering the tip portion P1 of the coated electric wire 31 prevents a tip of the stranded wire from spreading, so that not only short-circuit due to the spread conductors is prevented, but also the handleability of the coated electric wire 31 is improved.

Figure 34:
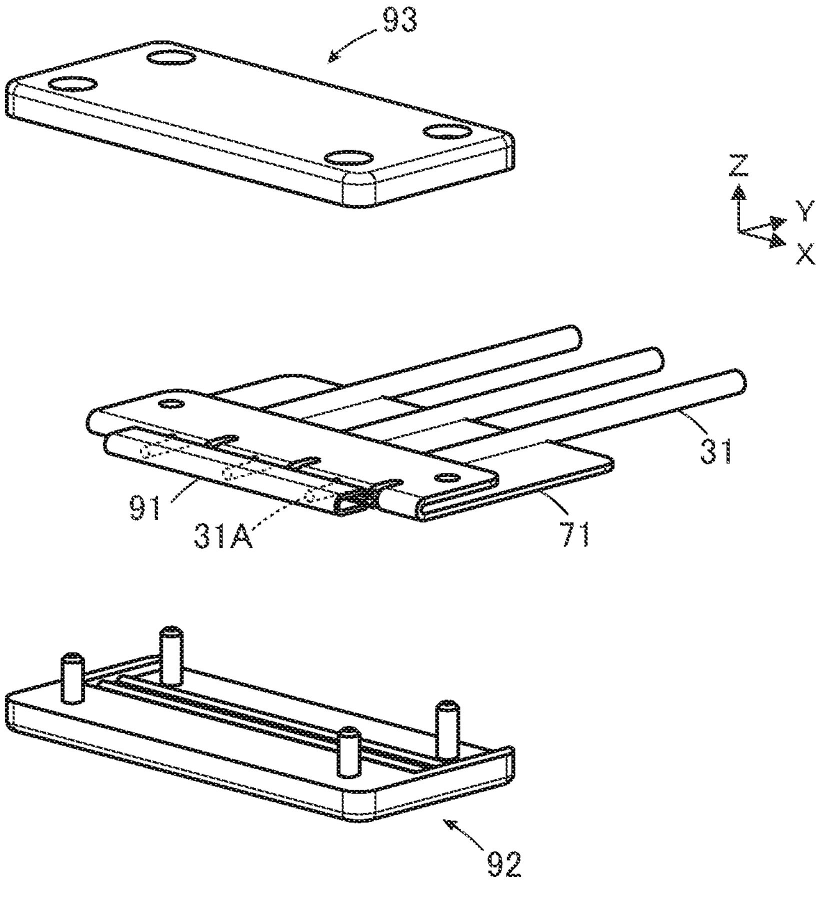
FIG. 34 is an assembly view of a connector assembly according a modification of Embodiment 4.
Figure 35:
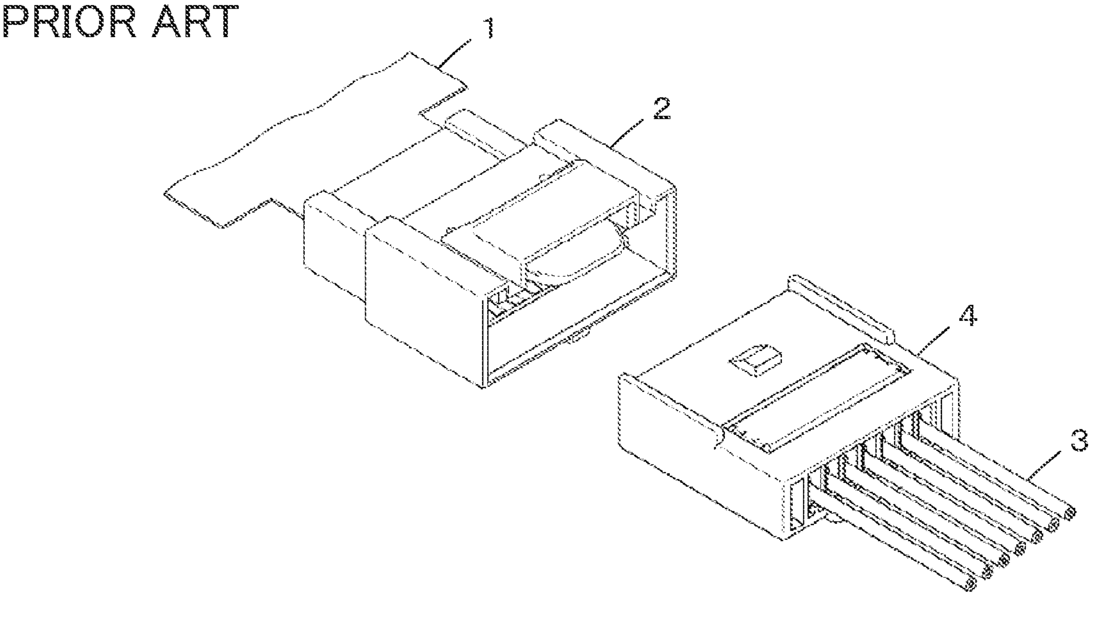
FIG. 35 PRIOR ART
FIG. 35 is a perspective view showing a conventional connector.

Instead of covering, with the insulating coating portion 31B, the conductor portion 31A at the tip portion P1 of the coated electric wire 31 projecting from the sheet type conductive member 71 toward the −Y direction, the connector assembly may be configured such that the conductor portion 31A exposed by removing the insulating coating portion 31B projects from the sheet type conductive member 71 toward the −Y direction as the tip portion P1 and that the outer periphery of the projecting conductor portion 31A is covered with an insulating tape 91 as shown in FIG. 34; even in this configuration, short-circuit of the conductor portions 31A of the adjacent coated electric wires 31 can be prevented.

In this case, as shown in FIG. 34, it is necessary to use a first insulator 92 and a second insulator 93 each having a structure in which the conductor portions 31A covered with the insulating tape 91 can be accommodated.

While the three flexible conductors 21B exposed on the surface of the sheet type conductive member 21, 51, 71 are electrically connected to the conductor portions 31A of the three coated electric wires 31 in Embodiments 1 to 4 above, the invention is not limited thereto, and one or more flexible conductor (s) 21B can be electrically connected to a conductor portion (s) 31A of one or more coated electric wire (s) 31 in a similar manner.

While the covered electric wire 31 is used as an electric wire to be connected to the flexible conductor 21B of the sheet type conductive member 21, 51, 71 in Embodiments 1 to 4 above, an electric wire formed of only the conductor portion 31A whose outer periphery is not covered with the insulating coating portion 31B may be connected to the flexible conductor 21B of the sheet type conductive member 21, 51, 71.

What is claimed is:

1. A connector assembly comprising:

a sheet type conductive member having a flexible conductor exposed on a surface of the sheet type conductive member;

an electric wire having a conductor portion; and a connector connecting the conductor portion to the flexible conductor, wherein the connector includes a first insulator having a first retaining surface and a second insulator having a second retaining surface facing the first retaining surface, wherein the sheet type conductive member includes a first sheet portion having a retained portion disposed to face the first retaining surface, a second sheet portion joined to the retained portion via a folding-back line and disposed to face the second retaining surface with the second sheet portion being folded back onto the retained portion along the folding-back line, and at least one electric wire inserting hole formed in at least one of the retained portion and the second sheet portion and penetrating the sheet type conductive member, wherein the flexible conductor is exposed at least on a surface of the retained portion, wherein the conductor portion of the electric wire is passed through the electric wire inserting hole and disposed between the retained portion and the second sheet portion, and wherein the first insulator and the second insulator are fixed with each other such that the retained portion and the second sheet portion are superposed on each other and disposed between the first retaining surface and the second retaining surface, whereby the flexible conductor makes contact with and is electrically connected to the conductor portion of the electric wire.

2. The connector assembly according to claim 1, wherein the first sheet portion has an extension portion extending from the retained portion to an outside of the connector along a predetermined direction, and wherein the flexible conductor is disposed continuously from the retained portion to the extension portion.

3. The connector assembly according to claim 2, wherein the sheet type conductive member has a pair of the electric wire inserting holes each penetrating the sheet type conductive member, wherein the flexible conductor is disposed between the pair of the electric wire inserting holes, and wherein the electric wire is sequentially passed through the pair of the electric wire inserting holes, and the conductor portion of the electric wire situated between the pair of the electric wire inserting holes is electrically connected to the flexible conductor.

4. The connector assembly according to claim 3, wherein the flexible conductor is disposed continuously from the second sheet portion to the retained portion and the extension portion beyond the folding-back line and folded in two parts along the folding-back line, and wherein the conductor portion of the electric wire situated between the pair of the electric wire inserting holes is disposed between the two parts of the flexible conductor thus folded and electrically connected to the flexible conductor.

5. The connector assembly according to claim 4, wherein the pair of the electric wire inserting holes are disposed on the folding-back line.

6. The connector assembly according to claim 3, wherein the pair of the electric wire inserting holes are disposed within the retained portion and separately at positions inclined with respect to the folding-back line.

7. The connector assembly according to claim 3, wherein a tip portion of the electric wire sequentially passed through the pair of the electric wire inserting holes is accommodated between the first insulator and the second insulator, and wherein a base end portion of the electric wire sequentially passed through the pair of the electric wire inserting holes extends to the outside of the connector.

8. The connector assembly according to claim 3, wherein the electric wire has a structure in which an outer periphery of the conductor portion is covered with an insulating coating portion, wherein, between the pair of the electric wire inserting holes, the insulating coating portion is removed from the electric wire so that the conductor portion is exposed, and wherein, at a position other than between the pair of the electric wire inserting holes, an outer periphery of the conductor portion of the electric wire is covered with the insulating coating portion.

9. The connector assembly according to claim 2, wherein the sheet type conductive member has the electric wire inserting hole penetrating the sheet type conductive member on the folding-back line and at a position where the flexible conductor is exposed, wherein the flexible conductor is disposed continuously from the second sheet portion to the retained portion and the extension portion beyond the folding-back line and folded in two parts along the folding-back line, wherein the electric wire is passed through the electric wire inserting hole, and wherein the conductor portion of the electric wire disposed between the two parts of the flexible conductor thus folded is electrically connected to the flexible conductor.

10. The connector assembly according to claim 9, wherein the sheet type conductive member includes: an electric wire guiding hole disposed near the electric wire inserting hole and penetrating the sheet type conductive member; and a communication opening portion communicating the electric wire inserting hole and the electric wire guiding hole communicate with each other and penetrating the sheet type conductive member, wherein the electric wire inserting hole is constituted of a round hole having a diameter corresponding to a diameter of the conductor portion of the electric wire, wherein the electric wire guiding hole is constituted of a long hole having a width substantially equal to the diameter of the electric wire inserting hole, and wherein the communication opening portion has an opening width having a dimension smaller than the diameter of the conductor portion of the electric wire.

11. The connector assembly according to claim 9, wherein at least one of the first retaining surface and the second retaining surface has a rib for tightly attaching the flexible conductor to the conductor portion of the electric wire.

12. The connector assembly according to claim 9, wherein the electric wire has a structure in which an outer periphery of the conductor portion is covered with an insulating coating portion, and wherein, between the two parts of the flexible conductor thus folded, the insulating coating portion is removed from the electric wire so that the conductor portion is exposed.

13. The connector assembly according to claim 12, wherein the electric wire has a tip portion that projects from the electric wire inserting hole toward an outside of the sheet type conductive member and that is accommodated between the first insulator and the second insulator.

14. The connector assembly according to claim 13, wherein, at the tip portion, the insulating coating portion is removed from the electric wire so that the conductor portion is exposed.

15. The connector assembly according to claim 13, wherein, at the tip portion, an outer periphery of the conductor portion of the electric wire is covered with the insulating coating portion or an insulating tape.

16. The connector assembly according to claim 1, wherein a boss formed at one of the first retaining surface and the second retaining surface is inserted in a fixing hole formed at another of the first retaining surface and the second retaining surface, whereby the first insulator and the second insulator are fixed with each other.

17. The connector assembly according to claim 1, wherein the sheet type conductive member has a plurality of the flexible conductors aligned in a predetermined direction along the folding-back line, and wherein the plurality of the flexible conductors are electrically connected separately to the conductor portions of a plurality of the electric wires aligned in the predetermined direction.

18. A connecting method for connecting a conductor portion of an electric wire to a flexible conductor exposed on a surface of a sheet type conductive member, the method comprising:

passing the conductor portion of the electric wire through at least one electric wire inserting hole formed in at least one of a retained portion and a second sheet portion in the sheet type conductive member having a first sheet portion and the second sheet portion joined to the retained portion of the first sheet portion via a folding-back line, the at least one electric wire inserting hole penetrating the sheet type conductive member, folding back the second sheet portion onto the retained portion along the folding-back line so that the conductor portion of the electric wire is disposed between the retained portion and the second sheet portion, and fixing the first insulator and the second insulator with each other with the retained portion and the second sheet portion being sandwiched between a first retaining surface of the first insulator and a second retaining surface of the second insulator, whereby the flexible conductor makes contact with and is electrically connected to the conductor portion of the electric wire.

* * * * *